United States Patent [19]

Lewis

[11] Patent Number: 5,999,730
[45] Date of Patent: Dec. 7, 1999

[54] GENERATION OF FIRMWARE CODE USING A GRAPHIC REPRESENTATION

[75] Inventor: Timothy A. Lewis, Fremont, Calif.

[73] Assignee: Phoenix Technologies Limited, San Jose, Calif.

[21] Appl. No.: 08/958,376

[22] Filed: Oct. 27, 1997

[51] Int. Cl.⁶ ................................................. G05F 9/45
[52] U.S. Cl. ........................ 395/702; 395/702; 395/701; 395/712
[58] Field of Search .................................. 395/701, 702, 395/707, 709–712; 345/435, 326; 364/424.029, 280.09, 281.9

[56] References Cited

U.S. PATENT DOCUMENTS

| | | | |
|---|---|---|---|
| 4,589,063 | 5/1986 | Shah et al. | 364/200 |
| 5,339,433 | 8/1994 | Frid-Nielsen | 395/705 |
| 5,367,671 | 11/1994 | Feigenbaum et al. | 707/1 |
| 5,446,898 | 8/1995 | Bealkowski et al. | 396/651 |
| 5,487,141 | 1/1996 | Cain et al. | 345/435 |
| 5,524,246 | 6/1996 | Hurley et al. | 395/700 |
| 5,537,630 | 7/1996 | Berry et al. | 345/326 |
| 5,541,986 | 7/1996 | Hou | 379/20 |
| 5,581,670 | 12/1996 | Bier et al. | 345/326 |
| 5,634,095 | 5/1997 | Wang et al. | 345/326 |
| 5,864,862 | 1/1999 | Kriens et al. | 707/103 |
| 5,884,075 | 3/1999 | Hester et al. | 713/100 |

OTHER PUBLICATIONS

Ioannidie et al., "Porting AIX onto the student electronic notebook", ACM, pp. 76–82, May, 1991.

Becker et al., "An engineering environment for HW/SW Co simulation", 29 th IEEE Design Automation c onfe. pp. 129–134, 1992.

Synder, "Using ADA dor PC based software development", ACM, Wash. ADA Symp. Proc. pp. 1–9, Jun., 1991.

Angus, Jeffrey (1995) "Projects get KickStart," *Computer World*, Dec., pp. 105.

Bakkers, A., Sunter, J., adn Ploeg, E. (1995) "Automatic generation of scheduling and communication code in real–time parallel programs," *ACM Sigplan Notices*, 30(11) pp. 134–145.

(List continued on next page.)

*Primary Examiner*—Tariq R. Hafiz
*Assistant Examiner*—Anil Khatri
*Attorney, Agent, or Firm*—Foley & Lardner

[57] ABSTRACT

A utility with a windows interface with which a single original-equipment-manufacturer (OEM) programmer can generate firmware compatible with the Advanced Configuration and Power Interface (ACPI) specification. The firmware includes an ACPI name space, i.e., a hierarchical tree structure in operating system-controlled memory containing data objects, control method objects, and bus/device package objects. The hierarchical name space is constructed using a "click and drag" methodology, and is represented in the windows interface as a iconographic tree structure. From the root of the tree structure are branches for general purpose events, processor power control, sleep states, the system bus, and temperature controls. The system bus has branches for devices located thereon, and the devices have branches for folders containing current resource settings, hardware identification, possible resource settings, and set resource settings information. The utility prompts the OEM programmer during the creation of the name space for information required to complete the specification of the details of the system. The utility provides a large number of default components, from the level of the entirety of the hierarchical tree structure to the level of the individual devices. Using a recursive process, the constructed hierarchical tree structure is mapped to ASL source code with a structure roughly mirroring that of the tree structure. In general, the recursive process creates a name statement, opening brace, body and closing brace for each item, and child items within the scope of a parent item fall within the body of the parent item. For some items (such as fields, methods, packages and resources) it is necessary to override the generation of braces and/or the body.

24 Claims, 30 Drawing Sheets

OTHER PUBLICATIONS

Blaszczak, M. (1996) "Writing interactive web apps is a piece of cake with the new ISAPI classes in MFC 4.1," *Microsoft Systems Journal,May*,pp. 41–60.

Buhr, R.J.A. and Casselman, R.S. (1992) "Architectures with pictures," *OOPSLA '92*, pp.466–483.

Cypher, A. (1991) "Eager: Programming repetitive tasks by example," *Proc. ACM CHI '82*, pp. 33–40.

Durham, A.M. and Johnson, R.E. (1996) "A framework for run–time systems and its visual programming language," *OOPSLA '96*, pp. 406–420.

Fryer, Bronwyn (1994) "Make way for Wizards," *Computer World. Aug.*, 99–102.

Issamy, V. and Bidan, C. (1996) "Aster: A framework for sound customization of distributed runtime systems," *Proceedings of the $16^{th}$ ICDCS*, pp. 586–593.

Itoh, J., Yokote, T., and Tokomoro, M. (1995) "Scone: Using concurrent objects for low–level operating systmes programming," *OOPSLA '95*, pp. 385–398.

Johnson, J.A., Nardi, B.A., Zarmer, C.L. and Miller, J.R. (1993) "ACE: Building interactive graphical applications," *Communications of the ACM*, 36(4) pp. 41–55.

Kimura, Takayuki (1993) "Hyperflow: A uniform visual language for different levels of programming," *ACM Annual Computer Science Conference*,pp. 209–214.

Lampson, B. W. and Schmidt, E.E. (1983) "Organizing software in a distributed environment," *Proc. of the Sigplan '83 Symposium on Programming Language Issues in Software Systems*,pp. 1–13.

Maulsby, D., Greenberg, S. and Mander, R. (1993) "Prototyping an intelligent agent through Wizard of Oz," *Interchi '93*, pp. 277–284.

Oney, Walter (1995) "Building device drivers that conform to Windows 95® plug and play standards," *Microsoft Systems Journal, Dec.*,pp. 35–51.

Oney, Walter (1996) "Automatically configure your devices by exploiting plug and play VxD services," *Microsoft Systems Journal, Jan.*,pp. 57–79.

Rettig, Marc (1993) "Cooperative software," *Communications of the ACM*, 36 (4),pp. 23–28.

Roddy, B., Markowitz, S., and Epelman–Wang, H. (1996) "User interfaces for authoring systems with object stores," *Proceedings of Compcon '96*,pp. 305–309.

Schmidt, Douglas (1995) "Using design patterns to develop reusable object–oriented communications software," *Communications of the ACM*, 38 (10),pp. 65–74.

Schneider, S., Chen, V., Steele, J. and Pardo–Castellote, G. (1995) "The ControlShell component–based real–time programming sstem, and its application to the Marsokhod Martial Rover," *ACM Sigplan Notices*, 30 (11)pp. 55–67.

Smith, R.B., Maloney, J. and Ungar, D. (1995) "The self–4.0 user interface: Manifesting a system–wide vision of concreteness, uniformity, and flexibility," *OOOSLA '95*, pp. 47–60.

Smith, Walter (1995) "Using a prototype–based language for user interface: The Newton Project's experience," *OOPSLA '95*, pp. 61–72.

Thoen, F., Comero, M., Goossens, G. and DeMan, H. (1995) "Software synthesis for real–time information processing systems," *ACM Sigplan Notices*, 30 (11),pp. 60–69.

Williams, Al (1995) "Installing Windows 95®," *Dr. Dobb's Journal, Sep.*,pp. 28–36; 100–106.

Wilner, David (1995) "WindView: A tool for understanding real–time embedded software through system visualization." *ACM Sigplan Notices*, 30 (11),pp. 117–123.

Smith, David Canfield; Cypher, Allen, and Spoher, Jim (1994) "Kidsim: Programming agents without a programming language," *Communications of the ACM*, 38 (10),pp. 55–67.

Simmel, "Object based visual programming langugaes", *OOPSLA '91*, Oct. 1991, pp. 99–106.

Engels, "Building integrated software development environment part I: Tool specification", ACM Trans. on Soft Eng. 7 Methd. vol. 1, No.2 Apr. 1992, pp. 135–167.

Sybase, "Powersoft announces Optima++ version 1.5, developer, professional & enterprise editions", Sep. 1996, pp. 1–3.

FIG. 1B

| GLOBAL SYSTEM STATE | SOFTWARE RUNS | LATENCY | POWER CONSUMPTION | OS RESTART REQUIRED | SAFE TO DISASSEMBLE COMPUTER | EXIT STATE ELECTRONICALLY |
|---|---|---|---|---|---|---|
| G0-WORKING | YES | 0 | LARGE | NO | NO | YES |
| G1-SLEEPING | NO | >0, VARIES WITH SLEEP STATE. | SMALLER | NO | NO | YES |
| G2/S5-SOFT OFF | NO | LONG | VERY NEAR 0 | YES | NO | YES |
| G3-MECHANICAL OFF | NO | LONG | RTC BATTERY | YES | YES | NO |

FIG. 1D

| DEVICE STATE | POWER CONSUMPTION | DEVICE CONTEXT RETAINED | DRIVEN RESTORATION |
|---|---|---|---|
| D0-FULLY-ON | AS NEEDED FOR OPERATION | ALL | NONE |
| D1 | D0>D1>D2>D3 | >D2 | <D2 |
| D2 | D0>D1>D2>D3 | <D1 | >D1 |
| D3-OFF | 0 | NONE | FULL INIT AND LOAD |

FIG. 5A.1

```
Name(_PRS, ResourceTemplate()
{
        IO(Decode16,0x220,0x280,0x20,0x14),
        IO(Decode16,0x300,0x330,0x30,0x02),
        IO(Decode16,0x388,0x388,0x01,0x04),
        IRQ(Edge,ActiveHigh,Exclusive) {2,5,7,10},
        DMA(Compatibility,BusMaster,Transfer8) {1,3},
        DMA(Compatibility,BusMaster,Transfer16) {5,7}
}

Name(RSRC,ResourceTemplate()
{
        IO(Decode16,0x220,0x220,0x20,0x14,IOA),
        IO(Decode16,0x330,0x330,0x30,0x02,IOB),
        IO(Decode16,0x388,0x388,0x01,0x04,IOC),
        IRQ(Edge,ActiveHigh,Exclusive,IRQ) {},
        DMA(Compatibility,BusMaster,Transfer8,DMAA) {},
        DMA(Compatibility,BusMaster,Transfer16,DMAB) {}
}

Method(_CRS)
{
        Name(IOAP,Package(){0x220,0x240,0x260,0x280})
        Store(Index(IOAP,SBAA),Local0)
        Store(Local0,IOA._MIN)
        Store(Local0,IOA._MAX)

Name(IOBP,Package(){0x300,0x330})
        Store(Index(IOBP,SBBA),Local0)
        Store(Local0,IOB._MIN)
        Store(Local0,IOB._MAX)

Name(IRQP,Package(){3,4,5,7,10,11})
        Store(Index(IRQP,SBI),Local0)
        ShiftLeft(1,Local0,IRQ._IRQ)

Name(D8P,Package(){0,1,3})
        Store(Index(D8P,SBD8),Local0)
        ShiftLeft(1,Local0,DMAA._DMA)

Name(D16P,Package(){5,6,7})
        Store(Index(D16P,SBD1),Local0)
        ShiftLeft(1,Local0,DMAB._DMA)

return (RSRC)
}

Name(_SRS,1)
{
        Store(Arg0,RSRC)

Name(IOAP,Package(){0x220,0x240,0x260,0x280})
        Match(IOAP,MEQ,IOA._MIN,MTR,0,SBAA)
```

FIG. 5A.2

Name(IOBP,Package(){0x300,0x330})
Match(IOBP,MEQ,IOB._MIN,MTR,0,SBBA)

Name(IRQP,Package(){3,4,5,7,10,11})
FindSetRightBit(IRQ._IRQ,Local0)
Decrement(Local0)
Match(IRQP,MEQ,Local0,MTR,0,SBI)

Name(D8P,Package(){0,1,3})
FindSetRightBit(DMAA._DMA,Local0)
Decrement(Local0)
Match(D8P,MEQ,Local0,MTR,0,SBD8)

Name(D16P,Package(){5,6,7})
FindSetRightBit(DMAA._DMA,Local0)
Decrement(Local0)
Match(D16P,MEQ,Local0,MTR,0,SBD1)

| | Class Name | Generate (string) | Generate Brace | Generate Body |
|---|---|---|---|---|
| 1801 | CItem | x | x | x |
| 1802 | CItemAlias | x | | |
| 1803 | CItemDevice | x | | |
| 1804 |    CItemDeviceACAdapter | | | |
| 1805 |    CItemDeviceACPI | | | |
| 1806 |    CItemDeviceBattery | | | |
| 1807 |    CItemDeviceDMA | | | |
| 1808 |    CItemDeviceCOM | | | |
| 1809 |    CItemDeviceDock | | | |
| 1810 |    CItemDeviceEC | | | |
| 1811 |    CItemDeviceEIO | | | |
| 1812 |    CItemDeviceFan | | | |
| 1813 |    CItemDeviceFDC | | | |
| 1814 |    CItemDeviceIDE | | | |
| 1815 |    CItemDeviceIDEDrive | | | |
| 1816 |    CItemDeviceIndicators | | | |
| 1817 |    CItemDeviceISA | | | |
| 1818 |    CItemDeviceKBC | | | |
| 1819 |    CItemDeviceLid | | | |
| 1820 |    CItemDeviceLPT | | | |
| 1821 |    CItemDevicePCCard | | | |
| 1822 |    CItemDevicePCCardCard | | | |
| 1823 |    CItemDevicePCI | | | |
| 1824 |    CItemDevicePIC | | | |
| 1825 |    CItemDevicePowerButton | | | |
| 1826 |    CItemDeviceSleepButton | | | |
| 1827 |    CItemDeviceSpeaker | | | |
| 1828 |    CItemDeviceSuperIO | | | |
| 1829 |    CItemDeviceTimer | | | |
| 1830 |    CItemDeviceUSB | | | |
| 1831 |    CItemDeviceVGA | | | |
| 1832 | CItemEvent | x | | |
| 1833 | CItemField | x | | x |
| 1834 |    CItemBankField | x | | |
| 1835 |    CItemIndexField | x | | |
| 1836 | CItemFieldEntry | x | | |
| 1837 | CItemMethod | x | x | x |
| 1838 | CItemMutex | x | | |
| 1839 | CItemName | x | | |
| 1840 |    CItemNameBuffer | x | | |
| 1841 |    CItemNameEISAID | x | | |
| 1842 |    CItemNameNum | x | | |

FIG. 7B

| Class Name | Generate (string) | Generate Brace | Generate Body |
|---|---|---|---|
| 1843 CItemNamePackage | x | x | |
| 1844 CItemNameObject | x | | |
| 1845 CItemNameResource | x | x | |
| 1846 CItemNameString | x | | |
| 1847 CItemOperationRegion | x | x | |
| 1848 CItemPowerResource | x | | |
| 1849 CItemProcessor | x | | |
| 1850 CItemResource | x | | |
| 1851 CItemResourceDMA | x | | |
| 1852 CItemResourceIRQ | x | | |
| 1853 CItemResourceIO | x | | |
| 1854 CItemResourceIORange | x | | |
| 1855 CItemResourceMem | x | | |
| 1856 CItemResourceMemRange | x | | |
| 1857 CItemResourceStartFn | x | x | |
| 1858 CItemResourceEndFn | x | | |
| 1859 CItemScope | x | | |
| 1860 CItemSDT | x | | |
| 1861 CItemThermalZone | x | | |

```
2001 DefinitionBlock("DSDT.AML","DSDT",1,"PTLTD","Custom",0)
2002 {
2003   Scope(_SB)
2004   {
2005     Device(DEV0)
2006     {
2007       Name(_ADR,0x1)
2008     }
2009     Device(DEV1)
2010     {
2011       Name(_HID,EISAID("PNP0500")),
2012       OperationRegion(OR0,SystemIO,0x1000,0x1)
2013         Field(OR0,AnyAcc,NoLock,Preserve)
2014         {
2015           FE0,1,
2016           FE1,1,
2017           ,4,
2018           FE3,1,
2019           Offset(53),
2020           FE2,1
2021         }

2022       Name(_PRS,ResourceTemplate()
2023       {
2024         StartDependentFnNoPri()
2025         {
2026           IO(Decode16,0x100,0x100,0x1,0x8,IO0)
2027         }
2028       })
2029     }
2020   }
2021   Scope(_PR)
2022   {
2023     Processor(CPU0,0x0,0x100,0x6) {}
2024   }
2025 }
```

FIG. 10A

```
void CItemField::GenerateBody(CStdioFile&file,int nIndent) const
{
        CString str;
        POSITION pos;
        CString strTabs(' ',nIndent*TAB_SIZE);
        CString strTabs1(' ',(nIndent+1)*TAB_SIZE);
        CString strComma(",\n");

//Now print out sorted, with anonymous fields to fill in any gaps if ((GetHeadPosition()) 1=NULL)
        {
                WORD dwLowBit = 0;                              //    first entry which is greater than this
                WORD dwHighBit;                                 //    lowest entry which is higher than nLowBit
                WORD dwBit;
                BOOL bFinished;
                CItemFieldEntry*piEntry;
                CItemFieldEntry*piFieldEntry;

// Outer loop until all entries have been drawn
                while (TRUE)
                {
                        dwHighBit = 0xFFFF;
                        bFinished = TRUE;

for (pos = GetHeadPosition();pos 1=NULL;)
                        {
                                piFieldEntry = (CItemFieldEntry*)GetNext(pos);   // points to item dwBit =piFieldEntry->m_nStartByte*8+piFieldEntry->m_nStartBit;
                                if(dwBit>=dwLowBit && dwBit < dwHighBit)
                                {
                                        bFinished = FALSE;
                                        dwHighBit = dwBit;
                                        piEntry = piFieldEntry;
                                }
                        } if(bFinished)
                                break;

if(dwLowBit 1=0)
                                // not first time through
                                file.WriteString(strComma);

// Write out any anonymous fields
                        if(dwHighBit>dwLowBit)
                        {
                                //If there are any necessary offset fields
                                if(((dwHighBit & (~0x7))-(dwLowBit & (~0x7)))>=8)
                                {
                                        str.Format("Offset(%d),",dwHighBit/8);
                                        file.WriteString(strTabs1);
                                        file.WriteString(str);
                                        file.WriteString(g_strCR);
```

FIG. 10B

```
                                        dwLowBit = dwHighBit & (~0x7);
                                }
//              //Write out anonymous fields //              while((dwHighBit - dwLowBit) >255)
//              {
//                      file.WriteString(strTabs1);
//                      file.WriteString(",255,");
//                      file.WriteString(g_strCR);
//                      dwLowBit+=255;
//              } if(dwHighBit>dwLowBit)
                {
                        //Write remainder of fields
                        str.Format(",%d,",dwHighBit - dwLowBit);
                        file.WriteString(strTabs1);
                        file.WriteString(str);
                        file.WriteString(g_strCR);
                        dwLowBit = dwHighBit;
                }

}

// Write out the entry itself
        piEntry->Generate(str);
        file.WriteString(strTabs1);
        file.WriteString(str);

dwLowBit+=piEntry->m_nSizeBytes*8+piEntry->m_nSizeBits;
        }
        file.WriteString(g_strCR);
    }
}
```

FIG. 11A

```
void CItemSDT::Generate(CString&str) const.
{
        str.Format("DefinitionBlock(\"%s\",\"%s\",%X,\"%s\",\"%s\",%X)",
                m_strFileName,
                m_strName,
                m_bRevision,
                m_strOEMID
                m_strOEMTableID
                m_dwOEMRevision);
} void CItemScope::Generate(CString& str) const
{
        str.Format("Scope(%s)",m_strName);
        if(IsEmpty())
                str+=" {}";
} void CItemProcessor::Generate(CString& str) const
{
        str.Format("Processor(%s,0x%X,0x%X,0x%X)",m_strName,m_bID,m_dwPBlk,m_dwPBlkLen);
        if(isEmpty())
                str+= " {}";
} void CItemDevice::Generate(CString& str) const
{
        str.Format("Device(%s)",m_strName);
        if(IsEmpty())
                str+= " {}";
} void CItemNameNum::Generate(CString& strGenerate) const
{
        if (m_piParent->Type() == ET_NAME)
                strGenerate.Format("0x%s",m_strValue);
        else
                strGenerate.Format("Name(%s,0x%s)",m_strName,m_strValue);
} void CItemNameEISAID::Generate(CString& strGenerate) const
{
        strGenerate.Format("Name(%s,EISAID(\"%s\"))",m_strName,m_strValue);
}
```

FIG. 11B

```
void CItemField::Generate(CString& str) const
{
        CString strLock;

if (m_bLockRule)
                strLock = "Lock";
        else
                strLock = "NoLock";

str.Format("Field(%s,%s,%s,%s)",
                GetParent()->GetName(),
                m_szFieldWidths[m_nAccessWidth],
                strLock,
                m_szFieldTypes[m_nAccessType]);
}
void CItemOperationRegion::Generate(CString& str) const
{
        str.Format("OperationRegion(%s,%s,0x%X,0x%X)",
                m_strName,
                szRegionSpace1[m_nRegionSpace],
                m_dwOffset,
                m_dwLength);
        if(IsEmpty())
                str += " {}";
```

3

GENERATION OF FIRMWARE CODE USING A GRAPHIC REPRESENTATION

BACKGROUND OF THE INVENTION

The present invention is related to the generation of firmware for the basic input/output functions of a computer and, more particularly, to a utility providing a graphical interface such as a constructed iconographic tree structure with which an original equipment manufacturer (OEM) programmer can create a graphical representation of Advanced Configuration and Power Interface (ACPI) compatible firmware, and generate the firmware source code based on the graphical representation.

The firmware of a computer system is the portion of the system software, including the basic input/output system (BIOS), stored in read-only memory (ROM) in chips on the motherboard. Since legacy (i.e., pre-ACPI) operating systems do not have information concerning the devices on a platform, the BIOS provides the operating system on boot-up with the general information about how the devices on the platform are configured and controlled. For instance, the BIOS would inform the operating system regarding protocols of communication with the onboard video graphics adapter card and the sound card, if one is connected to the motherboard or is interfaced via an input/output (I/O) slot.

There are several drawbacks to allocating the power management, thermal management, battery management and plug-and-play functions to the BIOS firmware. For example, the BIOS is only accessed at boot-up and, therefore, these functions cannot be modified or updated subsequent to boot-up. Any alterations of the hardware subsequent to the boot-up cannot be handled by the BIOS. Another drawback is that the BIOS firmware and the hardware are strongly coupled. The evolution of the BIOS and the hardware cannot be independent and their ship cycles must be synchronized. Furthermore, there is limited space available in the BIOS firmware, so only relatively simple power management policies could be implemented.

Another problem is the complexity of the creation of BIOS firmware, particularly ACPI-compatible BIOS firmware. The specialized knowledge required to generate the BIOS code for a particular device is not only dependent on the device, but is also dependent on the platform on which it is to be installed, and the other devices with which it is to interact. Generating error-free code is of particular importance. Furthermore, the BIOS is fundamental to the operation of the machine, so its reliability, size and performance is critical. Consequently, the development of the BIOS is one of the most serious scheduling risks for an OEM due to the extensive testing that must be performed to insure its quality.

SUMMARY OF THE INVENTION

The present invention provides a utility used to generate a hierarchical tree structure representing power and data control information utilized by BIOS firmware of a computer system. The computer system having an operating system with predefined devices including a system bus and a processor and the BIOS firmware including a pointer to a root of the hierarchical tree structure corresponding to the power control and the data control information. The utility includes means for defining a first scope for the root of the hierarchical tree structure and means for attaching a bus object within the first scope of the root of the hierarchical tree structure. The bus object corresponds to the system bus of the computer system. The utility also includes means for defining a second scope for the bus object and means for attaching a processor object within the second scope of the bus object thereby indicating that communications to the processor of the computer system are routed via the system bus. The processor object corresponds to the processor of the computer system.

Preferably, the utility generates a root of the tree corresponding to the address in the BIOS firmware where a pointer to a data structure containing the power control and the data control information is located. A bus object representing the computer's system bus can be attached to the tree, and a device object representing a particular device can be attached to the bus object, indicating communications to the device are routed via the bus object. The device object has a hardware identification folder, current resource settings folder, possible resource settings folder, set resource settings folder, power set folder and power resource folder. The hardware identification folder contains a number that uniquely identifies the type and manufacturer of the device. Access of the current resource setting folder by the computer system informs the system of current resource settings of the device. Access of the possible resource settings folder by the system informs the system of possible resources utilized by the device. Access of the set resource settings folder by the computer system directs the system to set the resources utilized by the device. The power set and power resource folders have associated values corresponding to a power state level of the device, and access to the power set folder by the system directs the system to place the device in that power state level. Access of the system to the power resource folder produces the evaluation of the power requirements of the device while in that power state level. The utility can be encoded in a computer readable storage medium such as a memory device, a microprocessor with integrated memory, a compact disc, or a floppy disk.

The present invention provides a computer implemented, recursive method for producing computer code approximating a hierarchical tree structure of items, the computer having an operating system and BIOS, the operating system having predefined devices including a system bus and a processor, the BIOS including a pointer to a root of the hierarchical tree structure containing the power control and the data control information, the method comprising the steps of: defining a current item as a root of the hierarchical tree structure; generating header code corresponding to the current item; generating opening bracket override code if the current item has an opening bracket override, following the step of generating header code; generating an opening bracket notation if the current item has a child item and if the current item does not have the opening bracket override, following the step of generating header code; generating body override code if the current item has a body override, following the step of generating opening bracket override code or the step of generating the opening bracket notation; generating a recursive branch to the step of generating header code with the current item redefined as a parent item and the child item redefined as the current item, if the current item does not have a body override, following the step of generating opening bracket override code or the step of generating the opening bracket notation; generating closing bracket override code if the current item has a closing bracket override, following the step of generating body override code or the step of generating a recursive branch; and, generating a closing bracket notation if the current item has a child item and if the current item does not have the opening bracket override, following the step of generating body override code or the step of generating a recursive branch.

The present invention allows a single OEM programmer to efficiently generate the name space in a visual form as a iconographic tree structure using a "click and drag" methodology, and prompts the OEM programmer during the creation of the iconographic tree structure for information required to complete the specification of the details of the system. The utility then maps that tree structure to ASL code. The utility provides a large number of default components, from the level of the entirety of the hierarchical tree structure to the level of individual devices. The utility also provides tools that allow the OEM programmer to check that the hierarchical name space actually represents a functioning system. For instance, if the system does not include a processor the utility will notify the OEM programmer with an error message.

The present invention generates ASL code which performs as well as, and is as space-efficient as, "hand-coded" firmware. Once the utility passes review testing by the OEM and any related corporations, a time consuming step in the production schedule can be completely avoided.

An object of the present invention is to provide a utility with which a single OEM programmer can generate firmware, error-free, with a minimum of expertise, and with optimal time-efficiency.

Another object of the present invention is to provide a utility with which an OEM programmer can generate system firmware by creating an iconographic hierarchical tree structure representing the name space using a graphical windows interface.

A further object of the present invention is to provide a utility for an OEM programmer to generate system firmware, which provides useful default objects, and prompts the programmer for information needed to complete the specification of the system.

Still another object of the present invention is to provide code which generates system firmware with a hierarchical tree structure that is similar to, but not completely the same as, the hierarchical tree structure of the name space.

Further objects and advantages of the present invention will become apparent from a consideration of the drawings and the ensuing detailed description.

BRIEF DESCRIPTION OF THE DRAWINGS

The accompanying drawings, which are incorporated in and form a part of the present specification, illustrate embodiments of the invention and, together with the Detailed Description, serve to explain the principles of the invention:

FIG. 1B presents a table listing the characteristics of the global power states;

FIG. 1D presents a table listing the characteristics of the device power states;

FIGS. 5A.1 and 5A.2 show the ASL code for the possible resources settings method, a resource buffer correction program, the current resource settings method, and the set resource settings method;

FIG. 7 illustrates a table of overrides for items utilized by the flowchart of FIGS. 6A–6G;

FIG. 9 illustrates the ASL code corresponding to the exemplary hierarchical tree structure of FIG. 8; and FIGS. 10A and 10B provide the override code for producing the ASL code for the GenerateBody function for items of type CItemField.

FIGS. 11A and 11B provide the override code for producing the ASL code for the Generate(string) function for CItemSDT, CItemScope, CItemProcessor, CItemDevice, CItemNameNum, CItemNameEITHE, CItemField and CItemOperationRegion.

DETAILED DESCRIPTION OF THE PRESENT INVENTION

To circumvent the drawbacks of legacy BIOS's, an ACPI has been proposed as a power management standard by Intel Corporation of Santa Clara, Calif., Microsoft Corporation of Redmond, Wash., and Toshiba Corporation of Tokyo, Japan. Incorporated herein by reference in its entirety is the ACPI specification, a current draft of which can be found on the world wide web at www.teleport.com/~acpi/.

According to the ACPI specification, the operating system rather than the BIOS controls power management, thermal states, and plug-and-play (wherein enumeration and configuration of motherboard devices is performed by the operating system) functionality of the computer. This allows the operating system to evolve independently from the hardware, so that ACPI-compatible computers can gain the benefits of improvements and innovations in the operating system. Furthermore, this allows the hardware to evolve independently from the operating system, thereby decoupling hardware and operating system ship cycles.

Figure 1A:
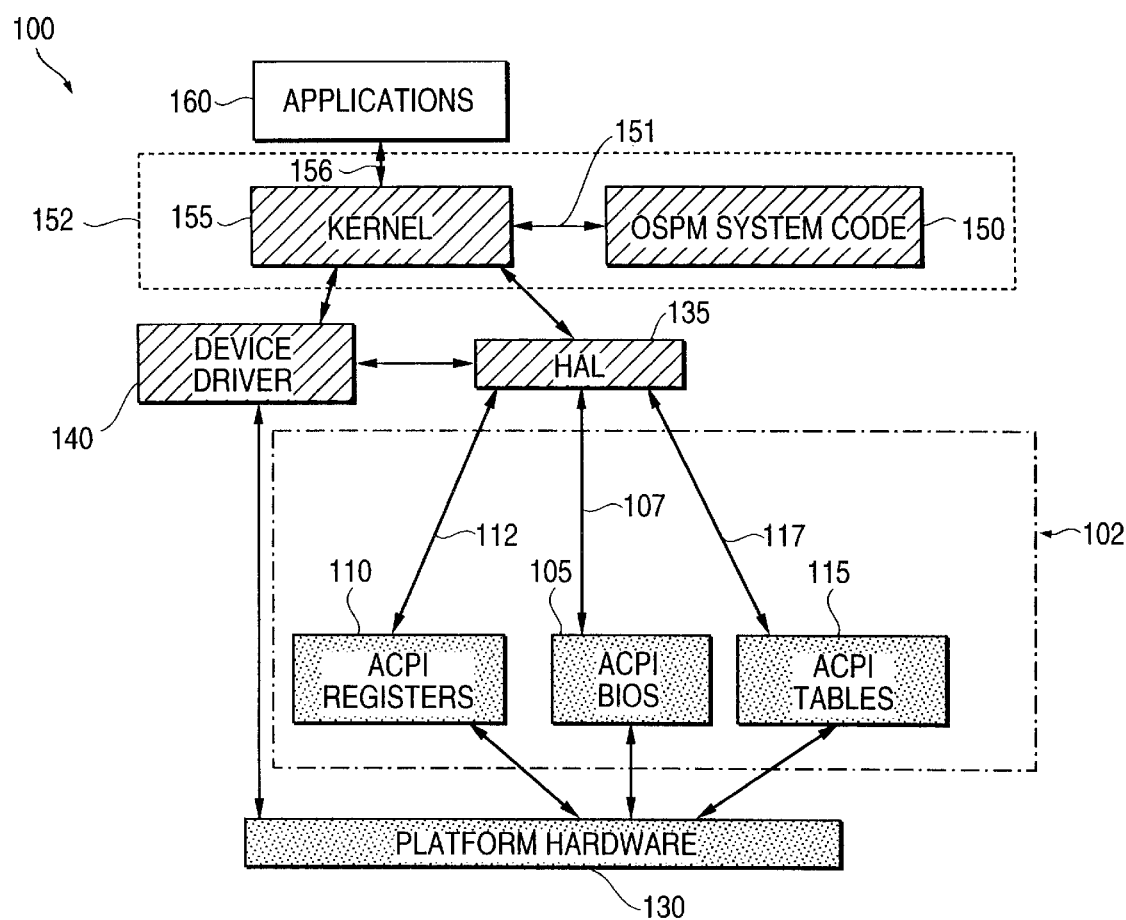
FIG. 1A illustrates a schematic of a ACPI-compatible computer system with ACPI firmware.

A schematic of an ACPI compatible computer system 100 depicting the relationship of ACPI firmware 102 to the components of the computer system 100 is shown in FIG. 1A. The ACPI firmware 102 includes ACPI BIOS 105, ACPI registers 110 and ACPI tables 115. The ACPI BIOS 105 contains the code that boots-up the computer system 100 based on the descriptions of the interfaces to, platform hardware 130 stored in ACPI tables 115 and the ACPI registers 110. The ACPI registers 110 are a standard set of hardware which are provided on every ACPI compliant platform. It should be noted that legacy BIOS functions, in addition to the advanced power management functions, are fulfilled by the ACPI BIOS 105.

In FIG. 1A the operating system 152 is divided into two components: (i) the operating system power management (OSPM) system code 150 handles all ACPI configuration and power management tasks, and (ii) the kernel 155 manages all memory functions, file functions, time functions, and application launches, and handles all peripheral device functions and system resource allocations not handled by the OSPM system code 150. Whereas, the ACPI firmware 102 is independent of the operating system technology, the components of the system 100 shown in FIG. 1A above the ACPI firmware 102 (i.e., applications 160, kernel 155, device driver 140, and hardware abstraction layer (HAL) 140) are technologies specific to the operating system 150. Non-power management communications, such as data transfers, from the kernel 155 to the hardware 130 are routed via a device driver 140.

Power management communications from the OSPM code 150 to the hardware 130 are routed via the kernel 155, the HAL 135 and the ACPI firmware 102. The hardware 130 is classified by functionality into predefined devices by the operating system 152. The HAL 135 communicates with the ACPI registers 110 via an ACPI register interface 112, the ACPI BIOS 105 via an ACPI BIOS interface 107, and the ACPI tables 115 via an ACPI tables interface 117. There are four major areas of power management communication between the operating system 152 and the hardware devices 130. First, because the devices 130 on a platform must share the available resources (such as RAM memory), a plug-and-play methodology informs the operating system 152 which resources are being used and how to allocate the available resources amongst the devices 130. Secondly, once the devices 130 are connected to the system 100, interrupts are needed to allow the system to stop the CPU and handle a task. Thirdly, direct memory accesses (DMA) are needed to allow the transfer of data to RAM without requiring interference from the CPU. The fourth major function of the operating system 152 is power management, i.e., control of the functionality and the level of power consumption of devices 130 on the platform.

Before the advent of portable computers, power consumption was not as critical a design consideration and generally devices had an ON state and an OFF state. However, portable computers (e.g., laptop and notebook computers) are powered by an internal battery which can only power the computer for a limited amount of time. Therefore, a more sophisticated power management system, having a number of intermediate power consumption states, is extremely useful. For desktop computers, although elaborate sleep strategies are not as necessary, it is also desirable to minimize unnecessary power usage since this reduces power costs and is of benefit to the world's environment.

Server machines actually stand to gain the greatest power savings from ACPI since they tend to have extremely large hardware configurations and, since servers generally have many users with varying work schedules, the machine can not be turned off in the evening. Therefore, it is desirable to have the server sleep as deeply as possible at night, while still being capable of returning to the working state to respond to service requests via a phone link, local network, etc. with reasonable latencies.

The ACPI specification describes a range of global system states between the OFF state and the fully ON state. The global system states apply to the entire system, and the state of the system at any instant is apparent to the user. The ACPI specification also describes a range of device power states between the OFF state and the fully ON state, although these states are generally not apparent to the user.

For example, laptop computers can allow the hard drive to go into a "sleep" state where the disc of the hard drive is not spinning. When in this "spin-down" state, the hard drive is still available to the operating system. However, access to data on the hard drive is not as rapid, since the disc of the hard drive must be "spun up" to its full rotation speed before data on the drive can be accessed. So, although the functionality of the hard drive is reduced, the power consumption can be greatly reduced.

According to the ACPI specification various levels of sleep can be chosen, depending on the device and the needs of the user. The sleep levels are labeled as S0, S1, S2, S3, S4 and S5, with S4 and S5 being the deepest sleep levels (S4 differs from S5 only in that in S5 all information that had been previously stored in RAM must be saved to non-volatile storage) and S0 being a fully operational state. For instance, if a computer is to function as an answering machine, then the sleep level can only be so deep that the computer is able to come up to a functioning level within a couple rings to answer the telephone before the caller hangs up. However, the latency time need not be too short, since it is acceptable for the computer to answer the phone after a ring or two.

The ACPI specification defines global system states according to the following conditions: (i) whether application software operates, (ii) what is the latency from external events to application response, (iii) what is the power consumption, (iv) whether an operating system reboot is required to return to a working state, (v) whether it is safe to disassemble the computer, and (vi) whether the state can be entered and exited electronically.

The table of FIG. 1B tabulates the characteristics of global states G0, G1, G2 and G3. The first column of the table lists the global state and its common name. The second column specifies whether application software runs in each of the global states. The third column specifies the latency time between an external event and a response from the CPU. The fourth column specifies the power consumption of each state. The fifth column specifies whether an operating system restart is required for the computer to resume operation. The sixth column specifies whether it is safe to disassemble the computer. The seventh column specifies whether the global state can be exited electronically.

Figure 1C:
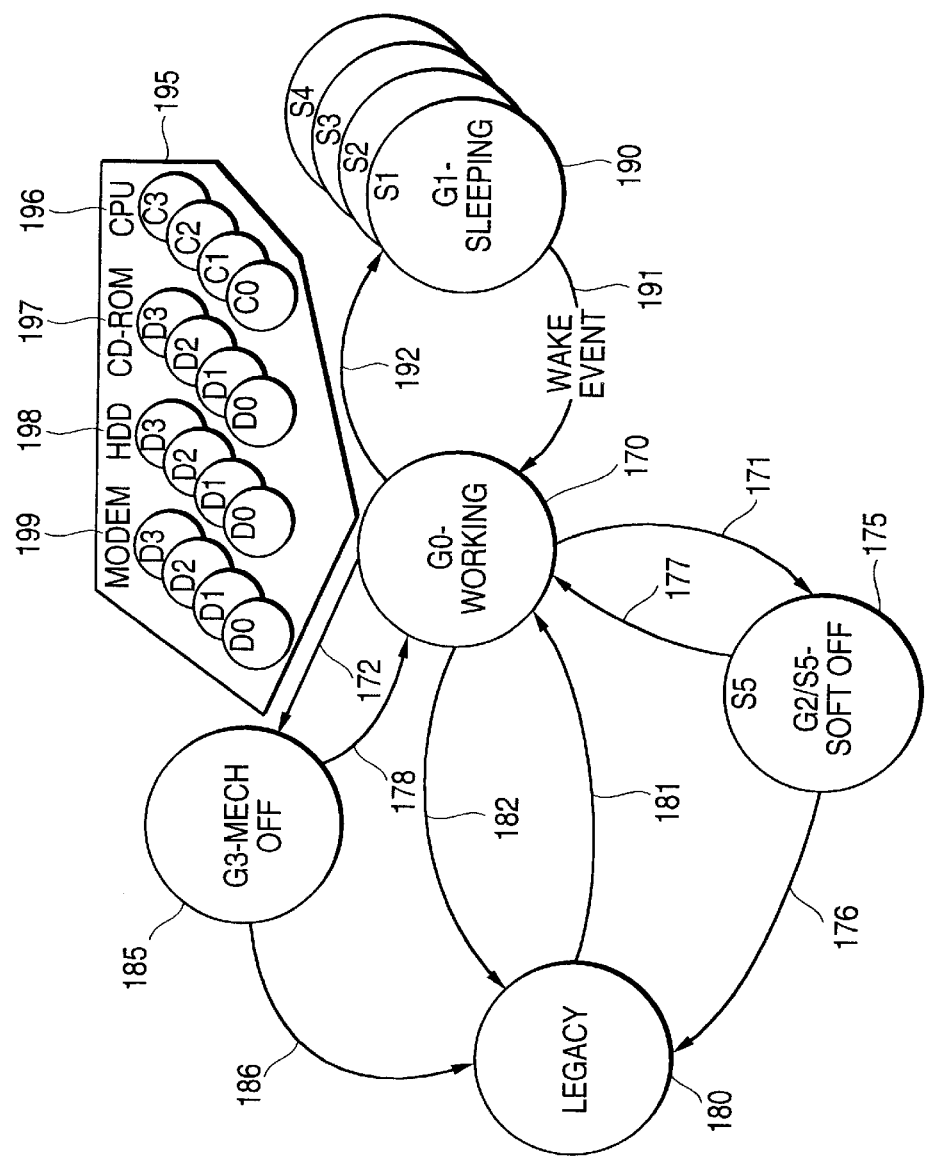
FIG. 1C illustrates a schematic of the allowed transitions between global power states.

A schematic of the possible transitions between ACPI global states G0 170, G1 190, G2 175, and G3 185 for a computer with legacy BIOS support is shown in FIG. 1C. (Computers without legacy support lack the legacy state 180, and all transitions 186, 181, 182 and 176 to and from the legacy state 180.) The global state G0 170 is termed the "working" state, since in this state the computer is used to do work. In this state, programmer application threads are executed and the power states of peripheral devices can be dynamically altered. The programmer can select amongst multiple performance/power characteristics of the system to have the ACPI firmware optimize for some balance of performance and battery life. The computer responds to external events in real time and, since current flows through the circuitry, it is not safe to disassemble the computer. As discussed below, in the working state the devices (in the example of FIG. 1C, the devices are CD-ROM player 197, hard drive (HDD) 198, and modem 199) can be in any of the device power states D0 through D3, and the CPU 196 can be in any of the processor power states C0 through C3. However, if a device 197–199 or the CPU 196 is put in a low-power (i.e., long response time) state it can be returned to the high-speed state with a "short" latency. The choice of device and processor power states is based on tradeoffs between speed, power, heat and noise.

The computer can transition 192 from the working state 170 to global state G1 190, termed the "sleeping" state. In this state, the computer "appears" to be off and user application threads are not executed. The latency for a wake transition 191 to the working state G0 170 is specified prior to entry in the sleep state 190. Return 191 to the working state G0 170 can be resumed without rebooting the operating system because the system context is saved. It is not safe to disassemble the computer because current flows through the circuitry. The global sleeping state G1 190 includes a number of sleep states S1–S4.

The computer can also transition 192 from the working state 170 to global state G2 175, termed the "soft off" state. This state G2 175 consumes a minimal amount of power, but requires a large latency to return to the working state G0 170. Because current flows through the circuitry it is not safe to repair or modify the circuitry. No programmer mode code (i.e., applications) or system mode code is run, the system's context will not be preserved by the hardware (i.e., the hardware does not retain a record of which applications are open and what data is stored in RAM), and the system must be restarted to return 177 to the working state G0 170.

Global state G3 185 is a mechanical OFF state that must entered 172 and exited 178 by mechanical means, e.g., a switch or a button. In the mechanical OFF state G3 185, no current runs through the circuitry, so there is no power consumption and the circuitry can be modified or repaired without damaging the hardware or endangering the service personnel. The operating system must be restarted to return 178 to a working state G0 170, and no hardware context is retained.

Computers that support legacy BIOS power management interfaces boot from the legacy state 180 and transition 181 to the working state G0 170 when an ACPI operating system loads. However, a system without legacy support (e.g., a reduced instruction set computing system) transitions 178 directly from mechanical OFF G3 185 to the working state G0 170.

The device power states are not visible to the programmer, and some devices can be in an OFF state even though the computer as a whole is in the working state G0. The ACPI specification defines the device states according to the following four characteristics: (i) how much power is used by the device, (ii) how much of the context of the device is retained by the hardware (the operating system is responsible for retaining any context which is not retained by the hardware), (iii) what the device driver must do to restore the device to the ON state, and (iv) how long it takes to restore the device to the ON state.

The table of FIG. 1D tabulates the characteristics of the device power states D0, D1, D2 and D3. The first column of the table lists the power state and its common name. The second column specifies the power consumption of the state. The third column specifies how much of the device context is retained. The fourth column specifies what the device driver must do to restore the device to the ON state. *Device Class Power Management Specifications*, which can be obtained at world wide web address www.teleport.com, provides more detailed descriptions of the device power states for various classes of devices. It should be noted that devices can have multiple power modes within a single device power state, and can switch between these modes undetected by the software.

The device power state D0 is termed the "fully-on" state. This state has the highest level of power consumption. The device is completely active and responsive, and will retain all relevant context information continuously.

The precise definition of device power state D1 varies from class to class. Generally, state D1 consumes less power and saves less context than state D0, and consumes more power and saves more context than state D2.

The precise definition of device power state D2 also varies from class to class. Generally, state D2 consume less power and saves less context than state D1, and consumes more power and saves more context than state D3.

The device power state D3 is termed the "OFF" state. All power is removed from the device and context information is lost in this state. Therefore, devices in this state do not respond to accesses, and the operating system must reinitialize the device when power is again applied. Devices in this state have the longest restore times.

When the operating system is idle, but not "sleeping," it can also put the system's processors into processor power states, the particulars of the processor power states being defined by the ACPI specification. In the C0 state, the processor is fully operational; in the C1 state, the processor is idle; in the C2 state, the processor is generally inactive, but is still responsive to calls to activation; and, in the C3 state, the processor is inactive and is not responsive to calls to activation.

The ACPI specification defines a hardware register interface that an ACPI-compatible operating system 152 uses to control the system power management features, provides an abstract interface via the ASL language programming language for controlling device power management and configuration details, and defines an interface between the operating system 152 and the firmware 102 for the application of the power management features and configuration details specified by the ASL code and the register interface. To provide maximum flexibility in hardware requirements and design, the system information, features and methods for controlling the features are stored in the ACPI tables 115 (see FIG. 1A). The operating system 152 has access to the ACPI tables 150, via HAL 135, and uses the table information to control the hardware devices 130. These tables 115 also list the system capabilities, such as which sleep power states are supported, descriptions of the power planes, clock sources and system indicator lights available to the system, details about the batteries, etc.

Figure 1E:
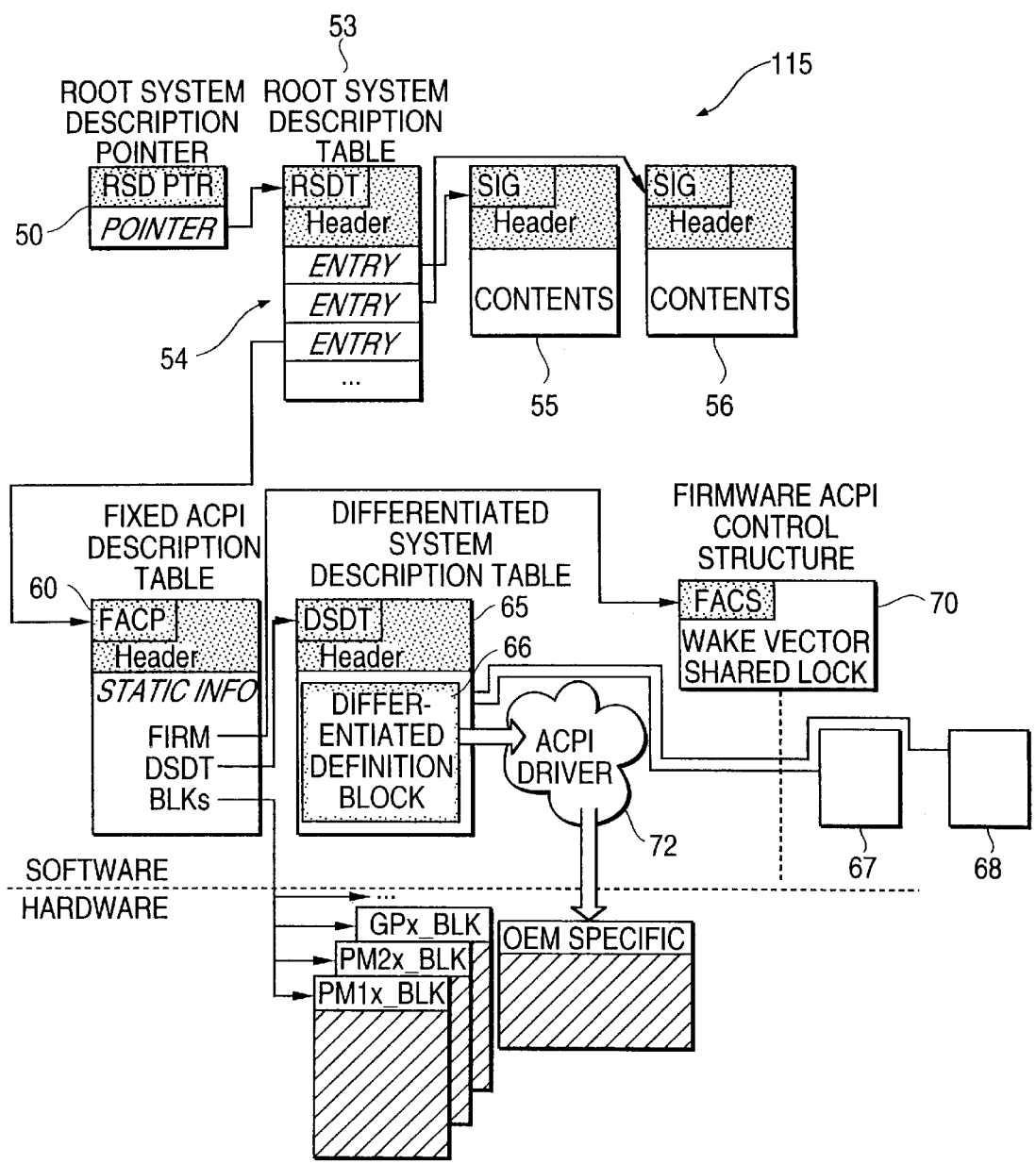
FIG. 1E illustrates a schematic of the ACPI tables.

The ACPI tables 115 are represented schematically in FIG. 1E. A root system description pointer 50 points to an initial table, the root system description table (RSDT) 53, and the entries 54 in the RSDT 53 point to subsequent tables 55, 56 and 60. It is required that one of the tables pointed to by the entries 54 of the RSDT 53 is the fixed ACPI description table (FACP) 60. The FACP table 60 defines various static power management information, as well as the implementation and configuration details of the ACPI registers 110. Data within the FACP 60 also includes entries that describe ACPI features such as the interrupt mode used (one of two industry standards can be chosen), addresses for power management event register blocks, addresses for power management control register blocks, the address of the power management time register block, addresses for generic purpose event register blocks, worst case latency times to enter and exit the processor power states C2 and C3, etc.

It is required that one of the tables pointed to by the FACP 60 is the differentiated system description table (DSDT) 65. This table 65 includes the differentiated definition block (DDB) 66 which contains implementation and configuration information used by an ACPI driver 72 (a component of the operating system which is not shown in FIG. 1E) to perform power management, thermal management, or plug-and-play functionality that extends beyond the information provided by the ACPI hardware registers 110.

Another of the tables that the FACP 60 is required to point to is the firmware ACPI control structure (FACS) 70. This table 70 contains a hardware signature, a waking vector and a global lock. The hardware signature is a four-byte number calculated by an algorithm which assigns a unique signature to each possible hardware configuration. Therefore, when the system awakens from a sleep state it will be able to tell if the hardware configuration has changed by comparing the current hardware signature to the previous hardware signature. The waking vector contains the address of a wake function to which control is passed upon waking. The global lock is used to synchronize access to shared hardware resources between the operating system 150 and the system management interrupts (i.e., the processor's operating system, independent, highest priority interrupts).

It is possible for the DSDT 65 to load additional definition blocks, either statically or dynamically, which in turn can define new system attributes or build on prior definitions. This allows the corresponding hardware to vary widely in implementation, and is also useful since it allows the more fundamental functions to be put in the DSDT 65 and less fundamental system options to be stored in the secondary system description tables 67 and 68. The additional system description tables, in this example FIG. 1D illustrates two such tables 67 and 68, are termed "secondary system description tables." Secondary system description tables 67 and 68 which are marked as "persistent" are saved by the operating system 152 and automatically loaded at every boot-up. This is useful in improving the load and enumeration time of devices which are connected to the system subsequent to the boot-up.

Figure 1F:
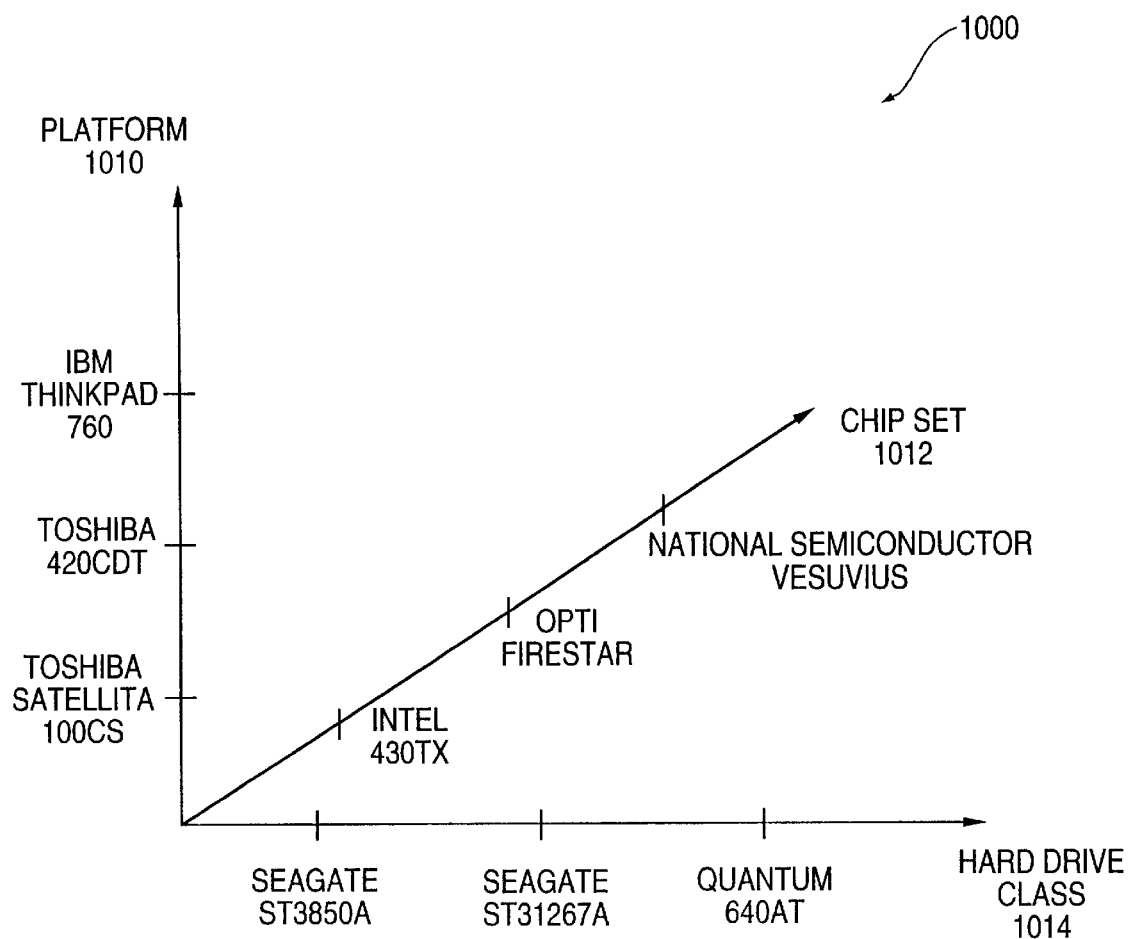
FIG. 1F illustrates an exemplary three-dimensional configuration space.

The complexity of the creation of BIOS firmware, particularly ACPI-compatible BIOS firmware, is exemplified by illustrating a particular configuration of devices on a platform as a point on a grid of a high-dimensionality configuration space, where there are "class axes" for platform, chip set, and components. For example, FIG. 1F illustrates an exemplary three-dimensional configuration space 1000 where there are class axes for the platform 1010, chip set 1012, and hard drive 1014. Each class axis is labeled with three items within the class. In this example, the devices along the platform axis 1010 are the Toshiba Satellite 100CS laptop, Toshiba 420CDT laptop and IBM Thinkpad 760; the devices along the chip set axis 1012 are the Intel 430TX, Opti Firestar, and National Semiconductor Vesuvius; and the devices along the hard drive axis 1014 are the Seagate ST3850A, Seagate ST31267A and Quantum 640AT. The number of grid points in FIG. 1F is therefore 3×3×3=27. Of course, in actuality there are many more types of platforms, chip sets and hard drives than shown in FIG. 1F. In general, the number N of grid points is $N = P \times C_1 \times C_2 \times C_3 \times \ldots \times C_n$, wherein P is the number of platforms along the platform axis, and $C_i$ is the number of devices in the $i^{th}$ device axis. Clearly, as the number n of device classes increases, the number of grid points increases exponentially.

The BIOS code can differ significantly between two configurations that are the same except for a platform, a chip set or a device (i.e., two configurations which share all coordinates in the class space but one). If the platform, the chip set or the device is altered, a complete and extensive reintegration of the BIOS code must be performed. Because there are so many possible configurations (i.e., so many points in the configuration space), the generation of the ACPI firmware is an extremely complicated task requiring the combined expertise of a team of programmers. Typically, one programmer handles the core logic chip set details, one programmer handles the super I/O chip details, one programmer handles the details of the specific platform, one programmer handles the power management details for the particular core logic chip set, a group of programmers handles the general architecture details, and another group of programmers handles the general power management details. The difficulty and level of specialization of the task is further compounded by the fact that the programming is done in assembly language and the devices are dealt with at the bit level.

One of the advantages of the inventive utility is that it allows a single OEM programmer to efficiently generate the name space in a visual form as a iconographic tree structure using a "click and drag" methodology, and prompts the OEM programmer during the creation of the iconographic tree structure for information required to complete the specification of the details of the system. The utility then maps that tree structure to ASL code. The utility provides a large number of default components, from the level of the entirety of the hierarchical tree structure to the level of individual devices. The utility also provides tools that allow the OEM to check that the hierarchical name space actually represents a functioning system. For instance, if the system does not include a processor the utility will notify the OEM with an error message.

The utility of the present invention generates ASL code which performs as well as, and is as space-efficient as, "hand-coded" firmware. Once the utility passes review testing by the OEM and any related corporations, a time consuming step in the production schedule can be completely avoided.

Figure 2A:
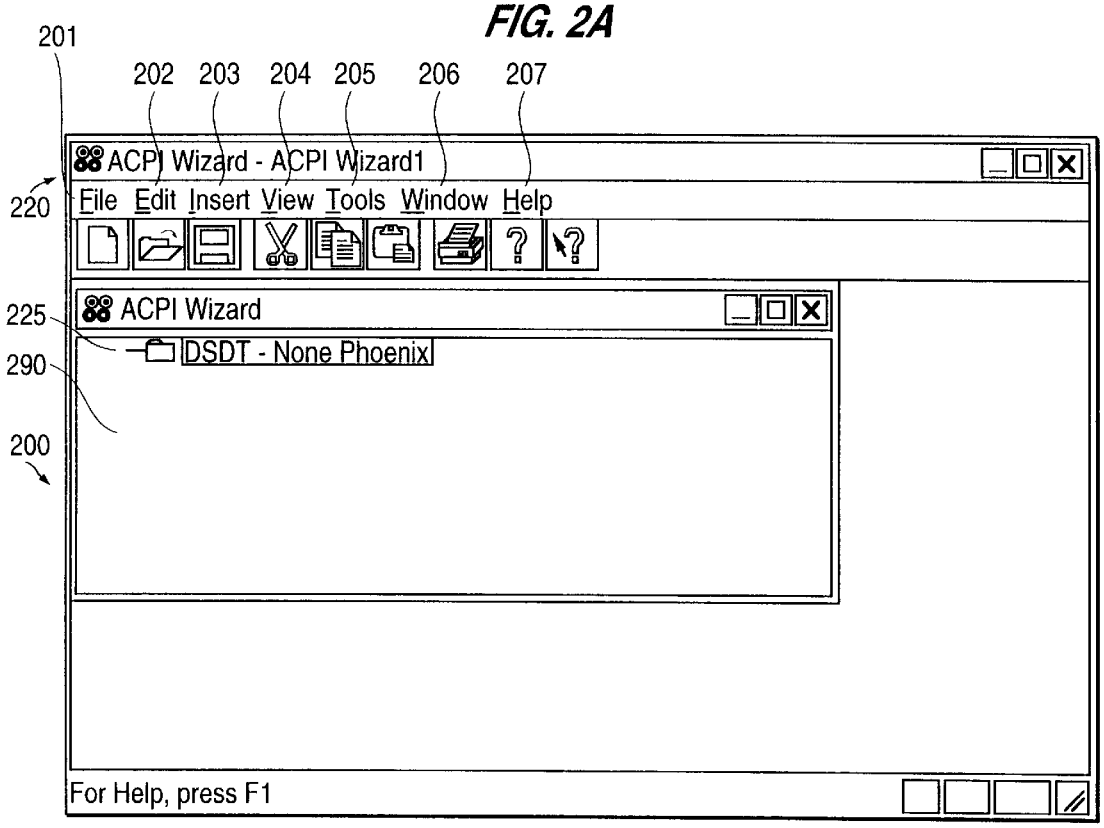
FIG. 2A illustrates the menu bar for the utility of the present invention.

The process of using the utility of the present invention, labeled as "ACPI Wizard" in the figures of the present specification, to configure a system through a window/menu interface begins with an initial window 200 with a menu bar 220 and a display window 290 containing an DSDT icon 225, as shown in FIG. 2A. The menu bar 220 provides the options of File 201, Edit 202, Insert 203, View 204, Tools 205, Window 206 and Help 207. To begin, the programmer chooses the Insert 203 menu since configuration of the system requires the insertion of objects (such as device, bus, and method objects) into the hierarchical name space shown iconographically (in an early stage where only the root 225 is present) in the display window 290.

Figure 2B:
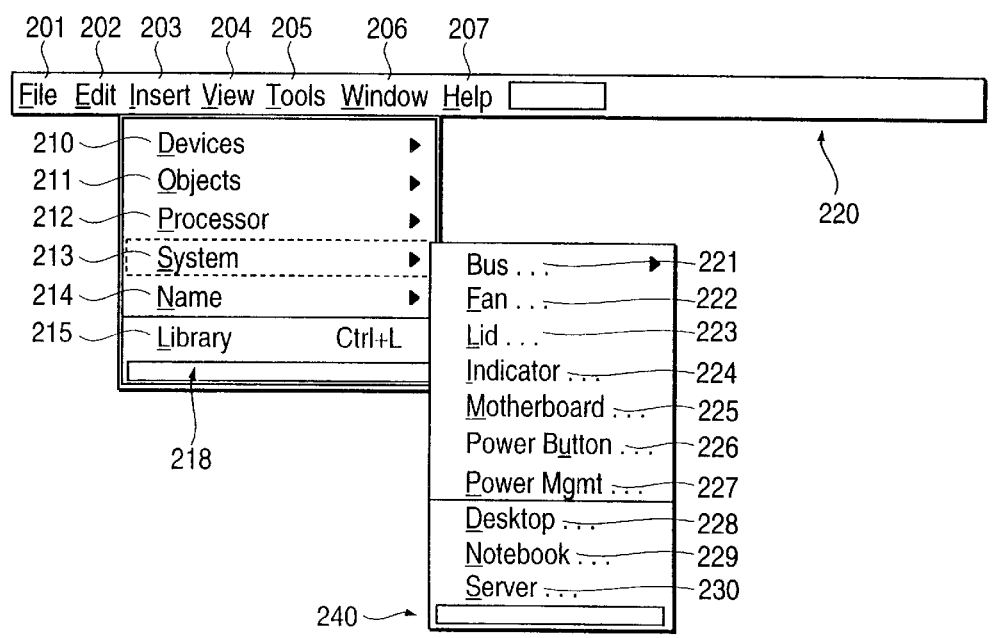
FIG. 2B illustrates the Insert pull-down menu with the System submenu open.

As shown in FIG. 2B, this provides the programmer with a pull-down menu 218 of insertable items which includes Devices 210, Objects 211, Processor 212, System 213, Name 214 and Library 215. Whereas the system can be configured by explicitly specifying the devices and objects using the Devices 210 and Objects 211 menus, respectively, the programmer is also provided the option of creating the entire system skeleton based on a default by choosing System 213. For instance, on choosing Objects 211 from the Insert 203 pull-down menu, as shown in FIG. 2D, a menu 240 provides the option of inserting any of the following objects: Alias 241, Bank Field 242, Device 243, Event 244, Field 245, Field Entry 246, Index Field 247, Method 248, Mutex 249, Operation Region 250, Power Resource 251, Processor 252, Scope 253 or Thermal Zone 254.

Of particular importance among these insertable objects is "scope," since this defines the immediate local reference of a device. All objects, except local objects, have a global scope. Local objects have a per-invocation scope and are used to process the current invocation from beginning to end. Since local objects can be given the same name, they are differentiated by the scope within which they fall. For instance, as shown in FIG. 3C, hardware identification (HID) folders _HID 562 and _HID 557 have the same name, yet the first 562 falls within the scope of both COM1 552 and the second 557 falls within the scope of FDC 554 and so they are differentiable.

Figure 4A:
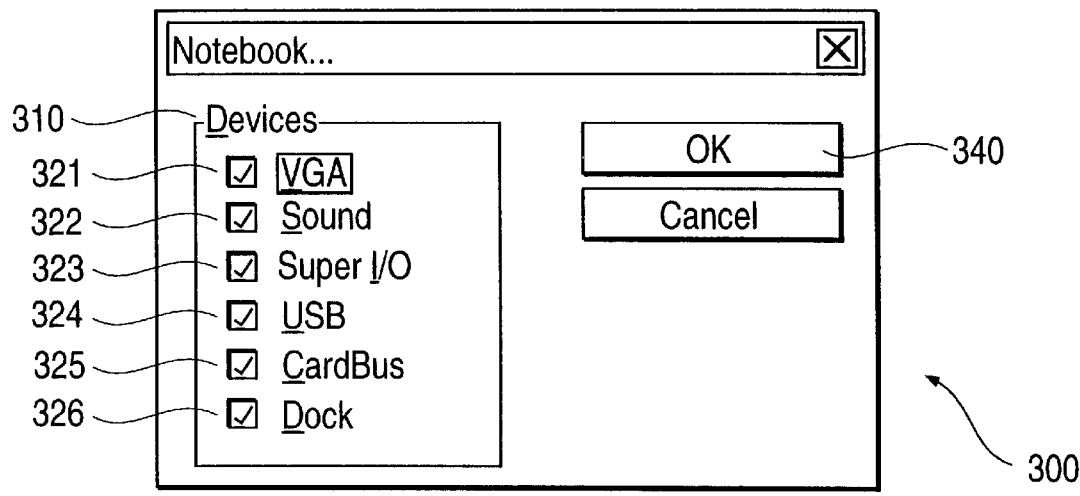
FIG. 4A illustrates the specification window for a notebook system.

Alternately, on choosing System 213 from the Insert 203 pull-down menu, as shown in FIG. 2B, a submenu 240 with the items Bus 221, Fan 222, Lid 223, Indicators 224, Motherboard 225, Power Button 226, Power Mgmt (i.e., "Management") 227, Desktop 228, Notebook 229 and Server 230 is provided. If, for instance, the programmer wishes to configure a notebook computer, then the Notebook 229 option is chosen. As shown in FIG. 4A, a Notebook devices specification window 300 then appears with a list 310 of standard devices that would normally be included in a notebook configuration. The list 310 of standard devices includes video graphics adapter (VGA) 321, sound card (Sound) 322, Super input/output bus (Super I/O) 323, universal serial bus (a new standard for buses for low speed devices such as mice, floppy drives, keyboards, joysticks, etc. which allows up to 127 different devices to be connected to a single computer port) USB 324, a bus for connections to PCMCIA cards (Cardbus) 325, and a dock for connecting the notebook up to a desktop computer (Dock) 326. As a default each of these items 321–326 are checked, as shown in FIG. 4A, so that the default configuration will include each of these items 321–326. The programmer can also remove any of these items 321–326 from the system to be configured by pointing and clicking on the appropriate item boxes, or add additional device or objects via the selection of Devices 210 or Objects 211 from the Insert menu 218.

Once the items 321–326 are checked as desired by the programmer, upon clicking on the OK button 340 the default hierarchical tree for the name space is then created. As shown in the default configuration of FIG. 3A, directly beneath the root DSDT 510 is the first branch of the hierarchical tree structure 505. The tree structure graphically illustrates "scope" of the devices, i.e., the power state dependencies of the devices and communication paths between the devices.

Figure 4B:
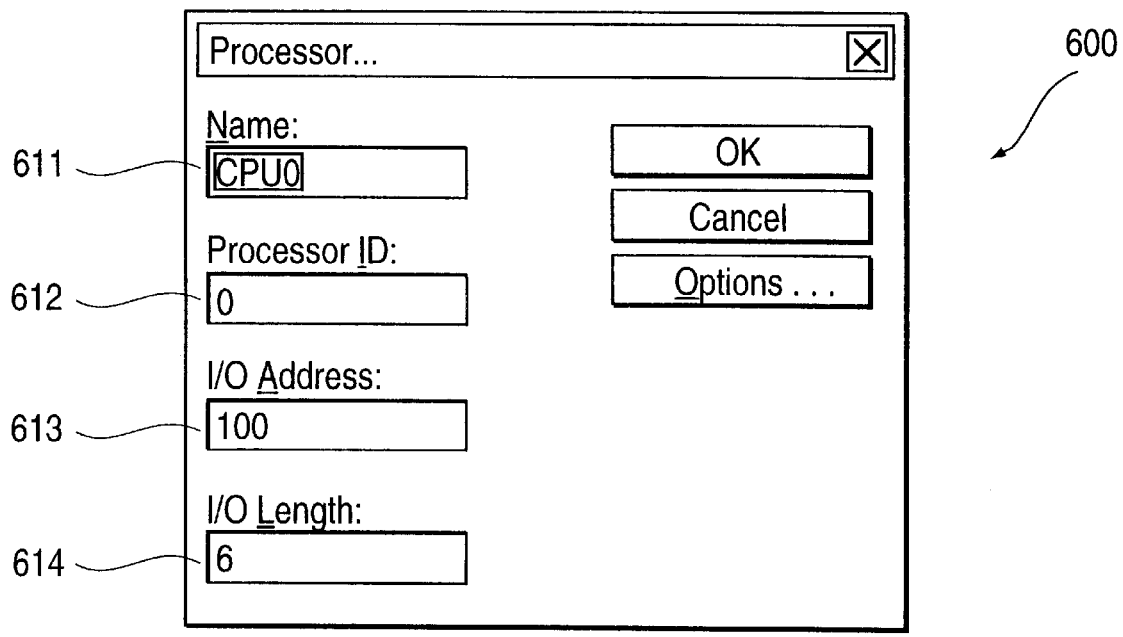
FIG. 4B illustrates the specification window for a processor.
Figure 4C:
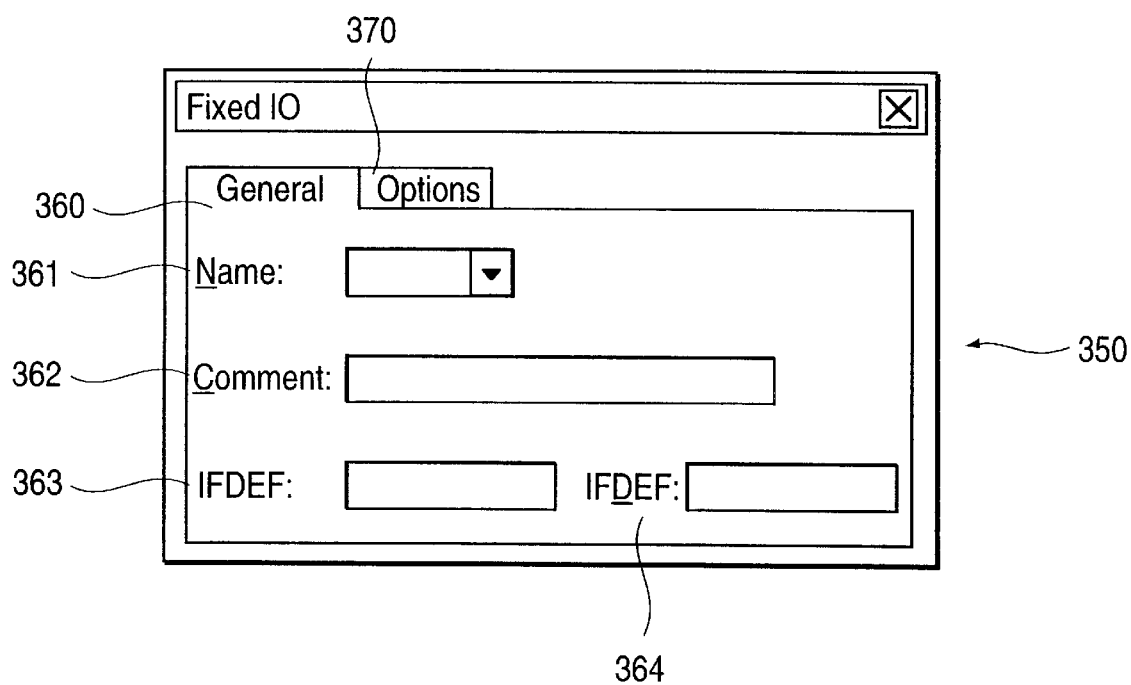
FIG. 4C illustrates the specification window for properties of a fixed I/O.

The properties of the devices can also be tailored by selecting Properties from the Edit 202 pull-down menu. FIG. 4C illustrates the resulting specification window 350 for the properties of a Fixed I/O. The specification window 350 has a General sheet 360 and an Options sheet 370 (the fields of the Options sheet 370 are obstructed by the General sheet 360). The General sheet 360 has a Name field 361 where the name of the object is specified, a Comments field 362 where comments to be included in the ASL code of the object can be entered, an IFDEF field 363 where IFDEF codes can be entered, and an IFNDEF field 364 where IFNDEF codes can be entered. (If a particular variable is specified as an IFDEF for an object and that variable appears in the code, then the object is included in the ASL code. Similarly, if a particular variable is specified as an IFNDEF for an object and that variable does not appear in the code, then the object is included in the ASL code.)

Figure 3A:
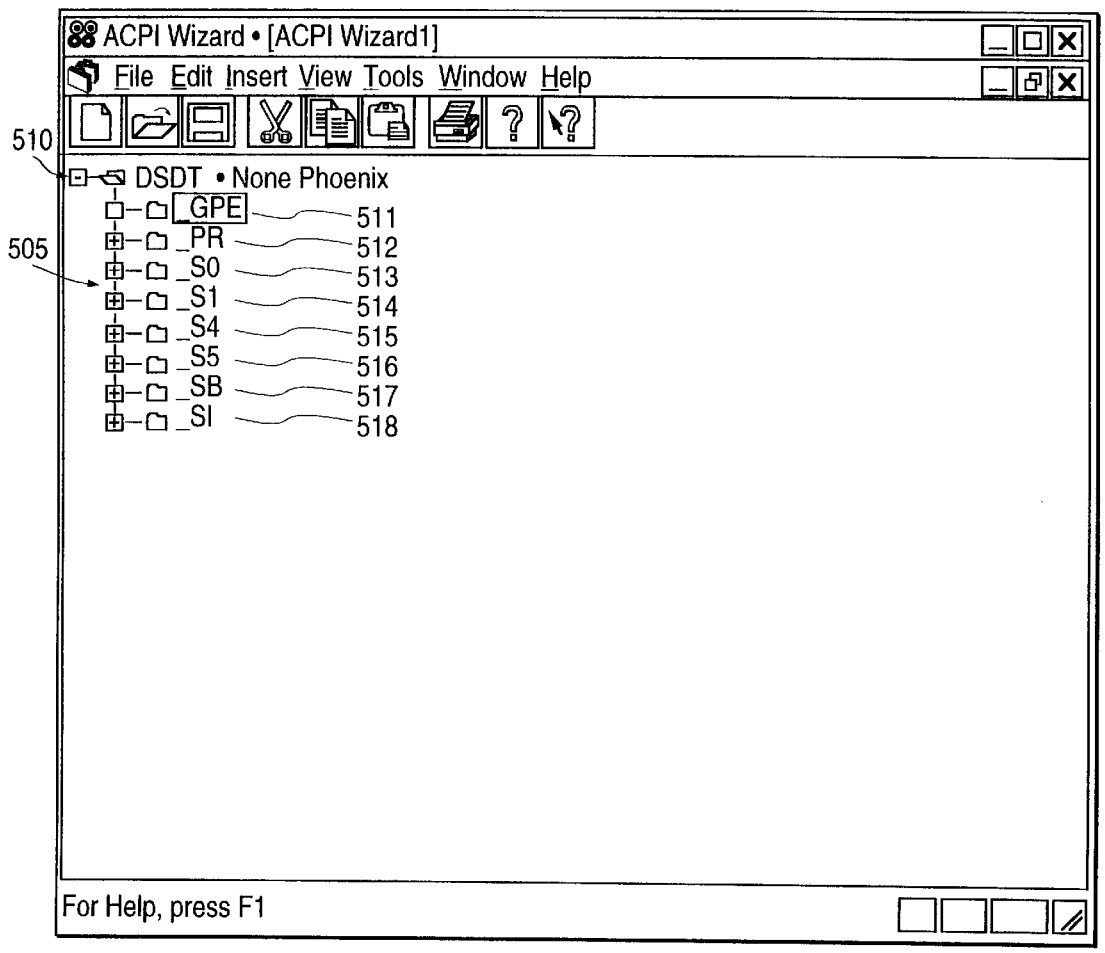
FIG. 3A illustrates a hierarchical name space with folders below the root DSDT closed.

In the first branch of the tree structure 500 of FIG. 3A are closed folders (a plus sign directly to the left of a folder indicate that the folder is currently closed, and can be opened by "pointing and clicking" on the plus sign) for general purpose events _GPE 511, processors _PR 512, power state _S 513, power state _S1 514, power state S4 515, power state S5 516, system bus _SB 517 and system indicators _SI 518. (The ACPI specification only requires support of power states S0, S5, and one intermediate power state—in this example, intermediate states S1 and S4 are both supported.) General purpose events include occurrences such as the change of state of buttons or keyboard keys, the connection of headphones or an AC adapter to the notebook computer, or a power plane of the notebook reaching a threshold temperature. Whenever a general purpose event happens a system control interrupt is generated to inform the operating system, and the operating system executes a handler stored under _GPE 511 folder. For example, when a notebook computer is electrically connected to the dock of a desktop computer, an electrical connection is made that triggers a logic chip in the notebook computer to send a numbered interrupt to the notebook computer's operating system. The operating system then searches for a handler of that number in the ASL code corresponding to the _GPE 511 folder, and if the handler exists the commands of the handler are executed.

In the _PR 512 folder is stored the power management information for the central processing units (CPUs). Generally, most notebook and desktop computers have a single CPU, and most servers have multiple CPUs. Using the series of pull-down menus Insert/Object/Processor, a specification window is provided with fields for Name 611, Processor ID 612, I/O Address 613 and I/O Length 614, as shown in FIG. 4B. The name and identification number provided in the Name and Processor ID fields 611 and 612 can be chosen arbitrarily. The address provided in the I/O Address field 613 is the device-state address whose value controls the performance of the processor. The I/O Length field 614 is provided with the byte length of the control input. Generally, as shown in FIG. 4B, the control input has a value of six: four bytes control the power state of the CPU (i.e., the power level and clock speed of the processor), and two bytes control how much power management is performed by the CPU. For instance, the CPU can or can not have a state where it completely terminates the monitoring of the system outside of the CPU. As mentioned above, the power levels of the processor includes the C0, C1, C2 and C3 states.

The sleep state information which the operating system 152 uses to put the core logic chip set into sleep states S0, S1, S4, and S5 is stored in the iconographic tree structure 505 under folders _S0 513, _S1 514, _S4 515 and _S5

516, respectively, as shown in FIG. 3A. For instance, if the operating system is to put the system into power level S5, the value in folder S5 515 assigned to a particular chip is applied to the I/O location and the power state of the chip then changes accordingly. It should be noted that because system levels S4 and S5 are the same from a hardware perspective, the information contained in branches S4 514 and S5 515 is the same.

In some systems, two large chips control the system power state—a first chip interfacing between the CPU and the primary system bus (i.e., PCI), and a second chip integrating a large number of peripheral controls and interfacing between the primary system bus and a secondary bus. If the two chips are manufactured by different vendors then generally each sleep state folder 513–516 will need to contain two values: one appropriate for each chip. However, in some systems these functions can be performed by a single chip, or the two chips can be manufactured by the same vendor, and only one value would be needed in each of the power state folders 513–516.

Figure 3B:
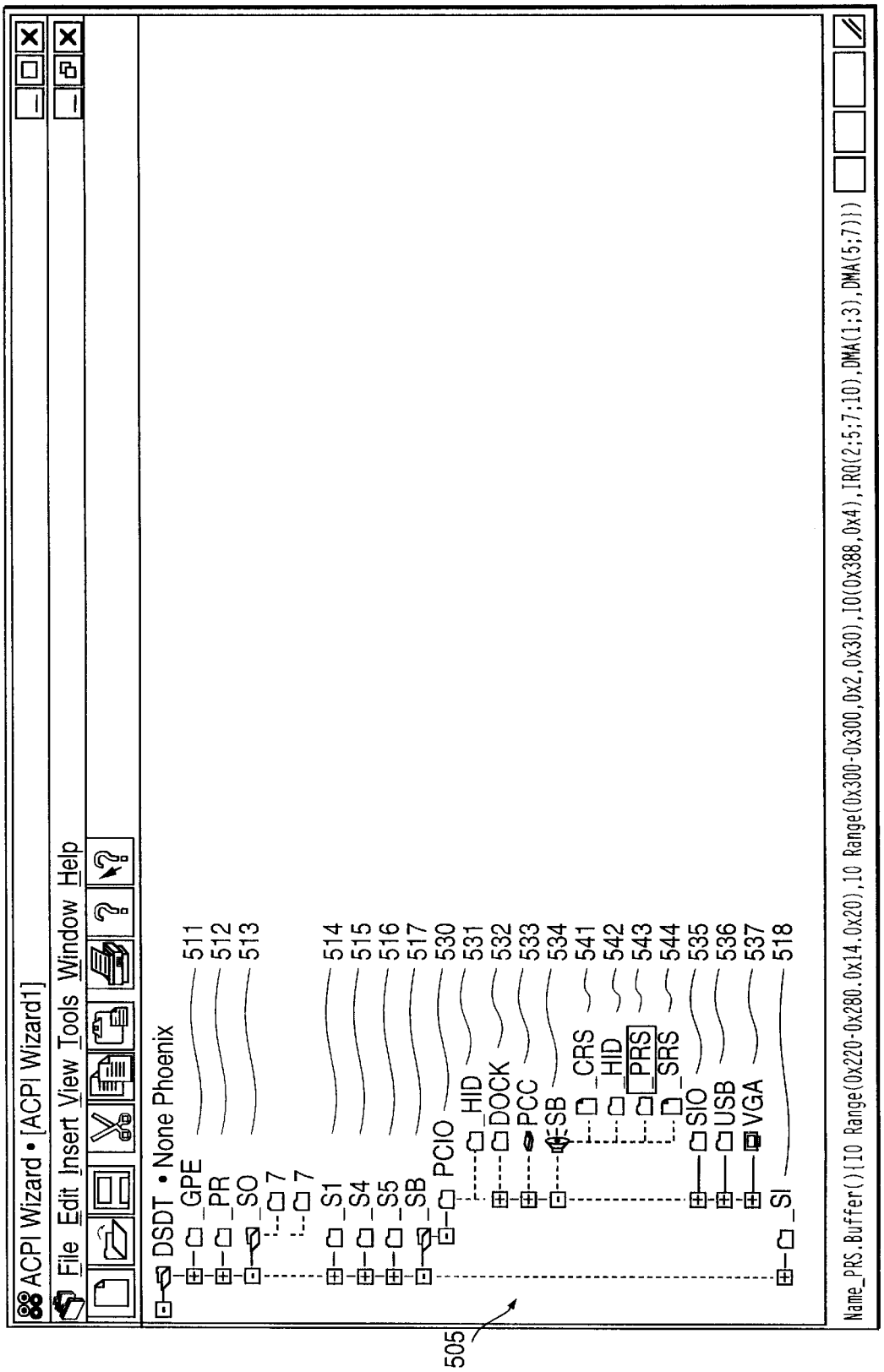
FIG. 3B illustrates the hierarchical name space with the highest sleep state (_S0) and system bus (_SB) folders open.
Figure 3C:
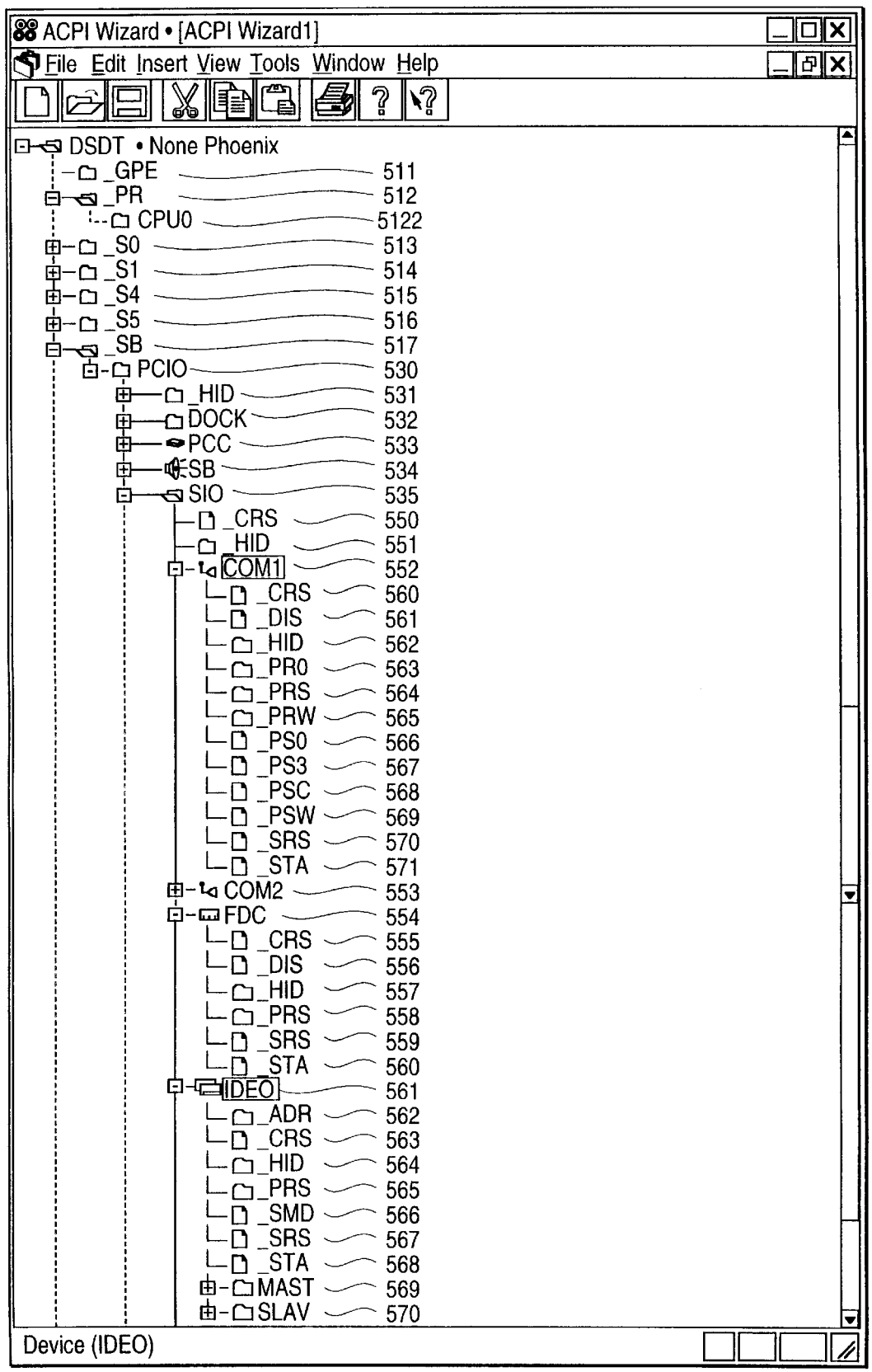
FIG. 3C illustrates the hierarchical name space with the system bus (_SB) folder open, and a number of folders within the system bus folder open.

Turning to FIG. 3B which illustrates the tree structure 505 with the system bus folder _SB 517 open, and FIG. 3C which additionally illustrates the SIO 535 folder open, most of the other objects and devices in the system are located in the _SB 517 folder, particularly under the Super I/O (SIO) 535 folder. As the tree structure 505 of FIG. 3B illustrates, due to the location of the CPU in the _PR 512 folder, access to most of the devices in the system must be through the system bus and the PCI bus, whose information is stored in the PCIO 530 folder. The _SB 517 folder therefore contains all the "primary buses," i.e., the buses which can be accessed by the CPU without passage through other devices. As shown in FIG. 3B, the PCIO 530 folder contains _HID 531, DOCK 532, PCC 533, sound blaster SB 534, SIO 535, USB 536 and VGA 537 folders.

As FIG. 3C illustrates the SIO 535 folder open, the scope of the Super I/O includes two communication ports COM1 552 and COM2 553, floppy disk controller FDC 554, hard disk controller (i.e., integrated drive electronics) IDE0 561, keyboard controller KBC 556, parallel port controller LPT1 557, universal system bus USB 558 and a video graphics adapter card VGA 559. It should be noted that since all of these devices 552–559 are within the scope of the super I/O SIO 535, the super I/O bus SIO 535 cannot be turned off until each of these devices 552–559 is turned off.

Each device on the super I/O has a current resource settings folder CRS, hardware identification folder _HID, possible resource settings folder _PRS, set resource settings folder _SRS, multiple power set folders _PSn, and multiple power resource folders _PRn, where n is an integer from zero to three. The information in these folders allows the operating system to control the power level of the device and the resources which the device uses. Each _HID folder contains a number that identifies the device by type and manufacturer. A complete list of identification numbers for devices can be found on the Microsoft website at www.microsoft.com/industry. Each current resource settings folder CRS provides a list of the current resources used by the device, such as I/O resources and interrupts. The possible resource settings folder _PRS provides a list of the configurations in which a device can have its resources set. The operating system sets the resources of the device by loading a resources configuration into the set resource settings folder _SRS of the device. The operating system allocates the available resources amongst the devices as best as possible to avoid conflicts. However, if conflicts are unavoidable then the devices deemed of least importance are disabled. The operating system accesses the nth power set _PSn to place the device in its nth power state. The nth power requirements folder _PRn contain the information necessary for the operating system 152 to place the device in its nth power state.

Figures 3D, 5B:
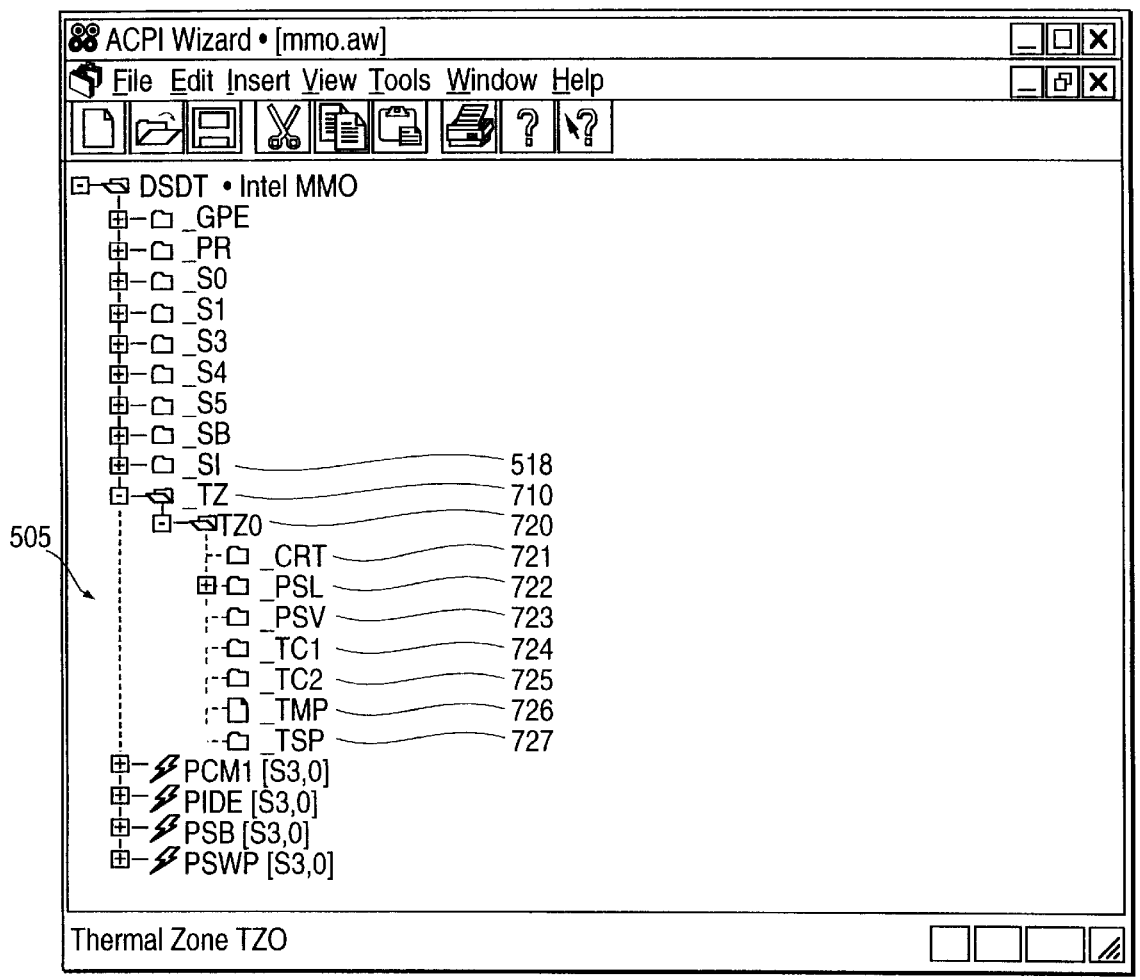
FIG. 3D illustrates a hierarchical name space with the temperature zone (_TZ) folder open.
FIG. 5B illustrates the ASL code for a thermal event.

As mentioned above, another component of ACPI is the monitoring and control of the temperature of components of the system. As shown in FIG. 3D, within temperature zone folder _TZ 710 is subfolder TZ0 720, and within folder TZ0 720 are folders _CRT 721, _PSL 722, _PSV 723, _TC1 724, TC2 725, _TMP 726, and _TSP 727. The method of reading the current temperature is contained within folder _TMP 726. For example, the ASL code for determining the temperature might be

```
Method(_TMP)
{
    Multiply(\_SB.PIX4.ISA.EC.TMP, 10,Local0)
    Return(Add(Local0, 2732))
}
```

This code retrieves the temperature at \_SB.PIX4.ISA.EC.TMP stored in degrees Centigrade, converts it to tenths of a degree Centigrade by multiplying by ten and stores the result in Local0, and adds 2732 to the result to convert the temperature to tenths of a degree Kelvin.

The polling interval (in tenths of a second) at which the operating system reads the temperature is specified in folder _TSP 727. For instance, if the operating system is to poll the temperature every 60 seconds the ASL code would be "Name(_TSP,600)". If a temperature polling time interval is not provided, general purpose events will be generated when the temperature crosses a passive or active trigger point. The folder _CRT 721 specifies the critical temperature at which the system will shut down. The system can cool itself using either active or passive heat control methods. As the temperature begins to rise, first passive heat control methods are activated, and if the temperature continues to rise even after the passive heat control methods are activated, then active heat control methods are activated.

The _PSV 723 folder specifies the temperature at which passive heat control, such as the reduction of the speed of the CPU, is activated. Active heat control methods include cooling by reducing the rate at which the battery is charged, since the charging of the battery produces considerable heat, or turning on a fan. No active heat control method folders are shown in the FIG. 3D. If an active heat control method was present, the folder containing the active heat control information would be labeled "_AC0."Folders _TC1 724 and _TC2 725 contain formulae for rates at which the system cools.

In this example, two cooling formulae are required because passive cooling is implemented by either reducing the speed of the CPU or reducing the speed at which the battery is charged. These formulae include information such as the ambient temperature and the physical structure of the system, e.g., the type of plastic that the system is encased in, and the surface area of the encasement as variables.

To insert a temperature control method using the utility of present invention the OEM programmer chooses Insert 203 from the menu bar 220 and chooses Objects 211 from the Insert menu, and Method from the Objects menu, as shown in FIG. 2D. The ASL code for this temperature control method where the operating system is notified by a general purpose event that a thermal event has occurred and the operating system must monitor the temperature is shown in FIG. 5B. The first command of the method is the Store command on line 3 which instructs that the current temperature is returned by the method _TZ. _TZO. _TMP and stored at Local0. Then, line 4 uses a LGreaterEqual command to determine if the current temperature which is stored at Local0 is greater than or equal to the passive heat control trip temperature stored at _TZ.TZ0._PSV. If the current temperature is indeed greater than or equal to the passive heat control trip temperature, then the code of line 6 is implemented and the operating system is notified of the condition using a Notify command. The Notify command passes the location of the thermal zone, _TZ.TZ0, as well as a numerical value to specify the action that the operating system must take. In this example, the numerical hex-value of "80" indicates that the operating system should monitor the temperature.

Control of the system indicator icons also falls under the domain of ACPI. Commonly, the system indicator icons are LED-illuminated stencils located on a laptop visible to the operator. The system indicators typically include a battery charge level indicator which notifies the programmer when the battery level is low, a battery state indicator which notifies the programmer when the battery is charging, a system status indicator which notifies the programmer of the sleep or working state the system is currently in, and a messages indicator to inform the programmer of the number of e-mail and/or voice mail messages which are waiting. For example, the battery state indicator is often represented by a battery—when the battery is colored red this indicates that the battery power is low, and when the battery is colored green this indicates that the battery is charged. The system status indicator provides a visual means for the user to identify the current system state. Any or all of the following indicators can be supported: working (i.e., S0), waling (i.e., S2 through S5), suspend (i.e., S2 or S3) or save-to-disk (i.e., S4).

Figure 2C:
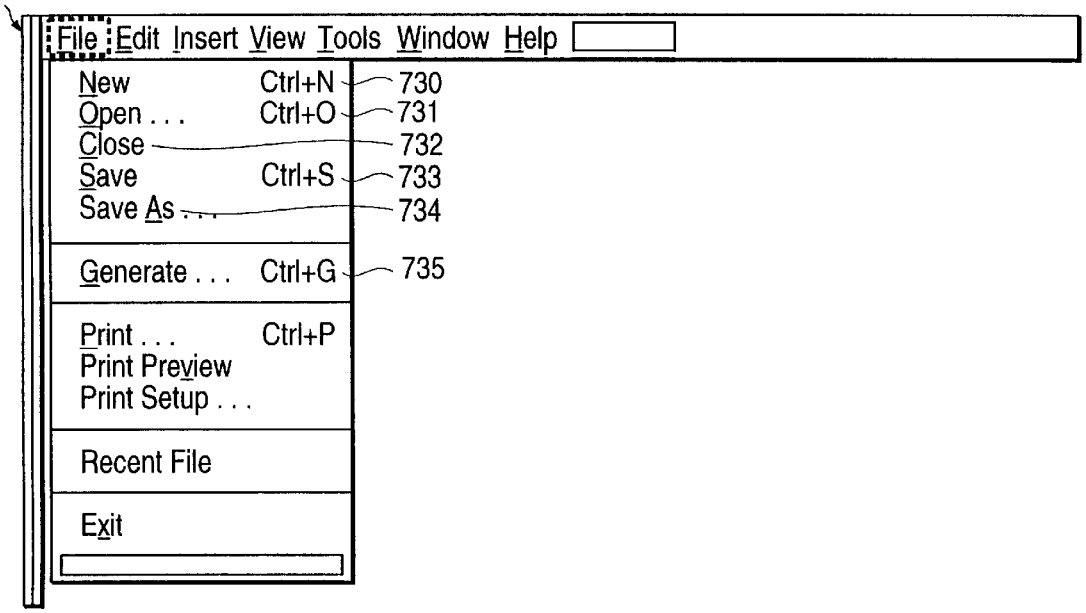
FIG. 2C illustrates the File pull-down menu.
Figure 2D:
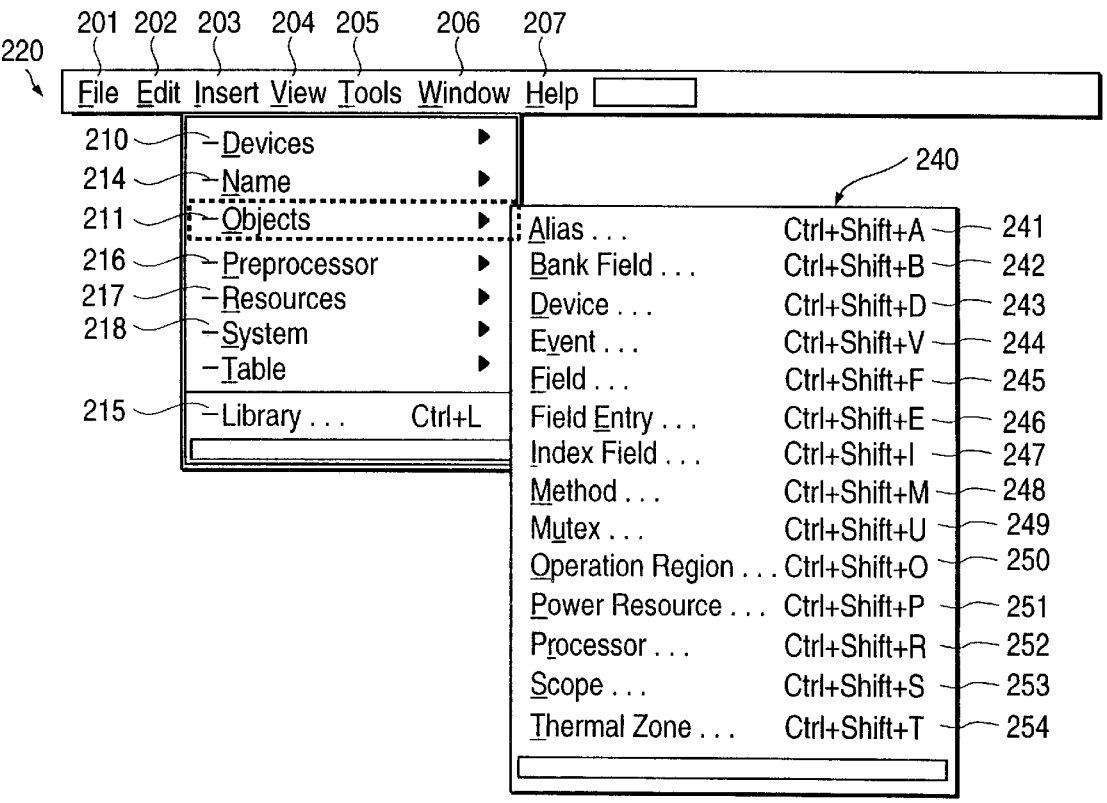
FIG. 2D illustrates the Insert pull-down menu with the Objects submenu open.

As the final stage in the creation of the source code (i.e., once the hierarchical name space is generated by the OEM), the ASL source code of the Differentiated System Distributor Table is generated by selecting Generate 735 from the File 710 menu, as shown in FIG. 2C. Then, the utility of the present invention generates the code which is to be stored as firmware by embedding the ASL code for each folder of the hierarchical name space within ASL code that provides a formatting structure. It should be noted that the code in the folders of the hierarchical name space, as well as the code of the formatting structure are created using the utility of the present invention and do not need to be generated by the OEM.

For instance, the ASL code for the Name statement generated automatically by the utility of the present invention in the possible resource settings folder _PRS 543 of the sound blaster folder SB 534 (the sound blaster is a chip for recording sounds, playback of wave files, control a of MIDI I/O, and frequency modulation synthesis) if the Sound box 322 in the Notebook specification window 300 of FIG. 4A is checked is

```
1    Name(_PRS, ResourceTemplate()
2    {
3        IO (Decode16, 0x220, 0x280, 0x20, 0x14),
4        IO (Decode16, 0x300, 0x330, 0x30, 0x2),
5        IO (Decode16, 0x388, 0x388, OxOl, 0x4),
6        IRQ(Edge, ActiveHigh, Exclusive) {2; 5; 7; 10},
7        DMA (Compatibility, BusMaster, Transfer8) {1;3},
8        DMA (Compatibility, BusMaster, Transferl6) {5;7}
9    }
```

The first IORange in the Resource Template of the _PRS Name statement specifies the I/O resources for the digitized playback of sound in the computer. The first IO expression indicates that the sound blaster can have I/O addresses anywhere between the hex-address (hexadecimal address) of 220 and the hex-address of 280, the I/O consumes fourteen hex-bytes (hexadecimal bytes), and is to be aligned on a 20 hex-byte boundary (i.e., the 14 hex-byte I/O data must be aligned to begin at hex-addresses 220, 240, 260 or 280). Multiple starting addresses for the 14 hex-byte data are provided so that if multiple devices might conflict because they are using overlapping I/O ranges, one or more devices can be programmed to use other, non-overlapping I/O registers, thereby facilitating plug-and-play functionality. The second I/O expression specifies the I/O format for the MIDI port. This second I/O expression indicates that this information can have I/O addresses anywhere from hex-address 300 to hex-address 330, the I/O consumes two hex-bytes and is to be aligned on a 30 hex-byte boundary. Again, the multiple starting addresses for the two hex-byte data are provided so that if multiple devices in the system are using overlapping I/O ranges, there is a reduced likelihood of conflicts. The third expression in the Buffer of the _PRS Name statement specifies the I/O format for ad lib sound cards, a sound card protocol used in much earlier versions of personal computers. The third I/O expression indicates that this information must have I/O hex-address 388 (no range is allowed), and the I/O consumes four hex-bytes. The next expression specifies the choice of numbers which the operating system can assign to the interrupts generated by the sound blaster. In this example, the sound blaster provides a choice of four interrupt values: 2, 5, 7 and 10. The arguments "Edge," "ActiveHigh," and "Exclusive" specify that the operating system recognize the interrupt on an edge from low to high, and that the interrupts are "exclusive," i.e., the operating system will assign another interrupt number to other devices in the system to avoid confusion about which devices generated which interrupts. Interrupts are generated for the sound blaster for functions like signaling the operating system that it is ready to record or has completed the generation of a section of a waveform. When the operating system receives the interrupt it identifies the origin of the interrupt by its value, and then inspects the above-specified IO ranges of the sound blaster to determine the type of event for which the interrupt was generated. Finally, the expression specifies that the direct memory access (DMA) channels can be 1 or 3, and 5 or 7. The first argument of both DMA statements, "Compatibility," specifies that the direct memory accesses are compatible with the ISA (industry standard architecture). The second argument of both DMA statements, "BusMaster," specifies that the direct memory accesses can be initiated by the _PSR and can utilize the entire bus. The second arguments of the DMA statements, "Transfer8" and "Transfer16," specify that the direct memory accesses on channels 1 or 3 are 8 bits, and those on channels 5 or 7 are 16 bits.

For completeness, FIGS. 5A.1 and 5A.2 show the ASL code for the possible resources settings method _PRS (e.g., 565), the current resource settings method _CRS (e.g. 555), and the set resource settings method _SRS (e.g., 567). (The function RSRC is called by the CRS method to correct a bug introduced in the previous version of the utility of the present invention.)

The automated creation of the ASL code from the hierarchical tree structure is generated by selecting Generate 735 from the File 710 menu (see FIG. 2C). An important aspect of the present invention is the generation of ASL code having a nested structure approximating or roughly mirroring that of the hierarchical tree structure, although differing from the tree structure due to particulars of the coding language. A recursive flowchart for the process of mapping a hierarchical tree structure to ASL code is provided in FIGS. 6A through 6B with the stages labeled in C++ pseudocode. In general, each item is first tested to see if its properties include an IFDEF in stage GenerateIFDEF 1110; its name is written by the GenerateName 1115 stage; an opening brace is generated by the first GenerateBrace 1120 stage; the body of the ASL code for the item is generated by the GenerateBody 1125 stage; a closing brace is generated by the second GenerateBrace 1130 stage; and the item is tested to see if its properties include a Not-IFDEF in stage GenerateIFDEF 1110. The stages represented by boxes with doubled side borders are shown in detail in the flowcharts of FIGS. 6B through 6F. In particular, the flowchart for GenerateIFDEF 1110 and 1135 is provided in FIGS. 6B and 6C, the flowchart for GenerateName 1115 is provided in FIG. 6D, the flowchart for GenerateBrace 1120 and 1130 is provided in FIG. 6E, and the flowchart for GenerateBody 1125 is provided in FIG. 6F.

Figure 6A:
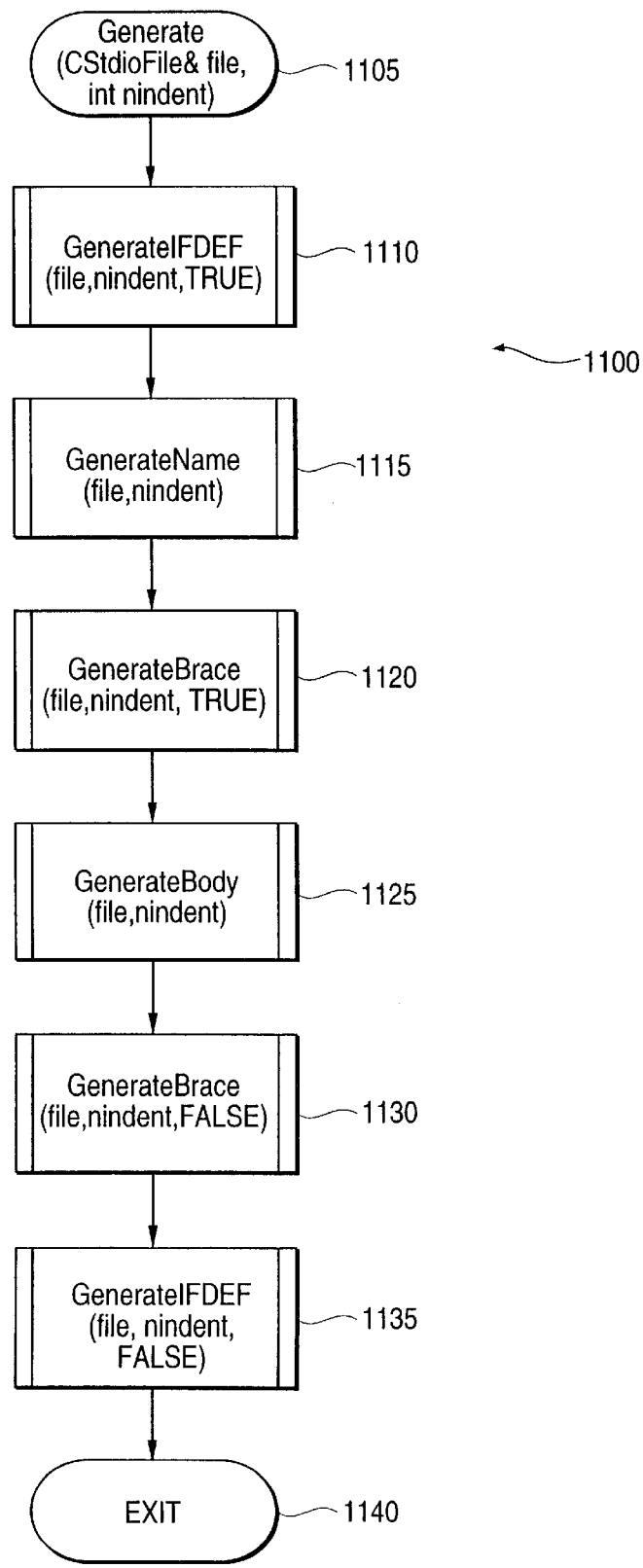
FIG. 6A illustrates the flowchart for the process of mapping a hierarchical name space tree structure to ASL code.
Figure 6B:
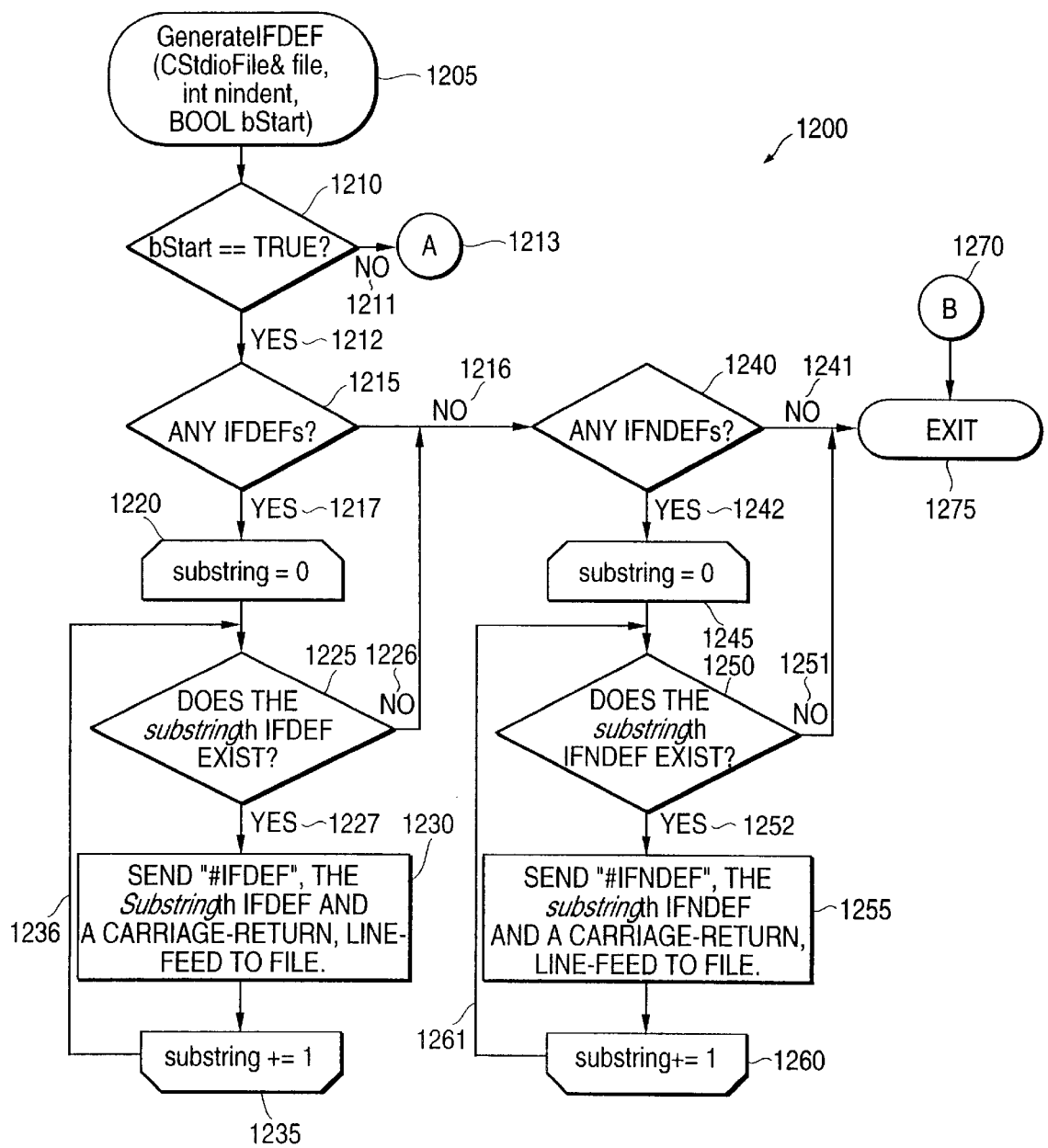
FIG. 6B illustrates a first portion of the flowchart for the GenerateIFDEF portion of the flowchart of FIG. 6A.
Figure 6C:
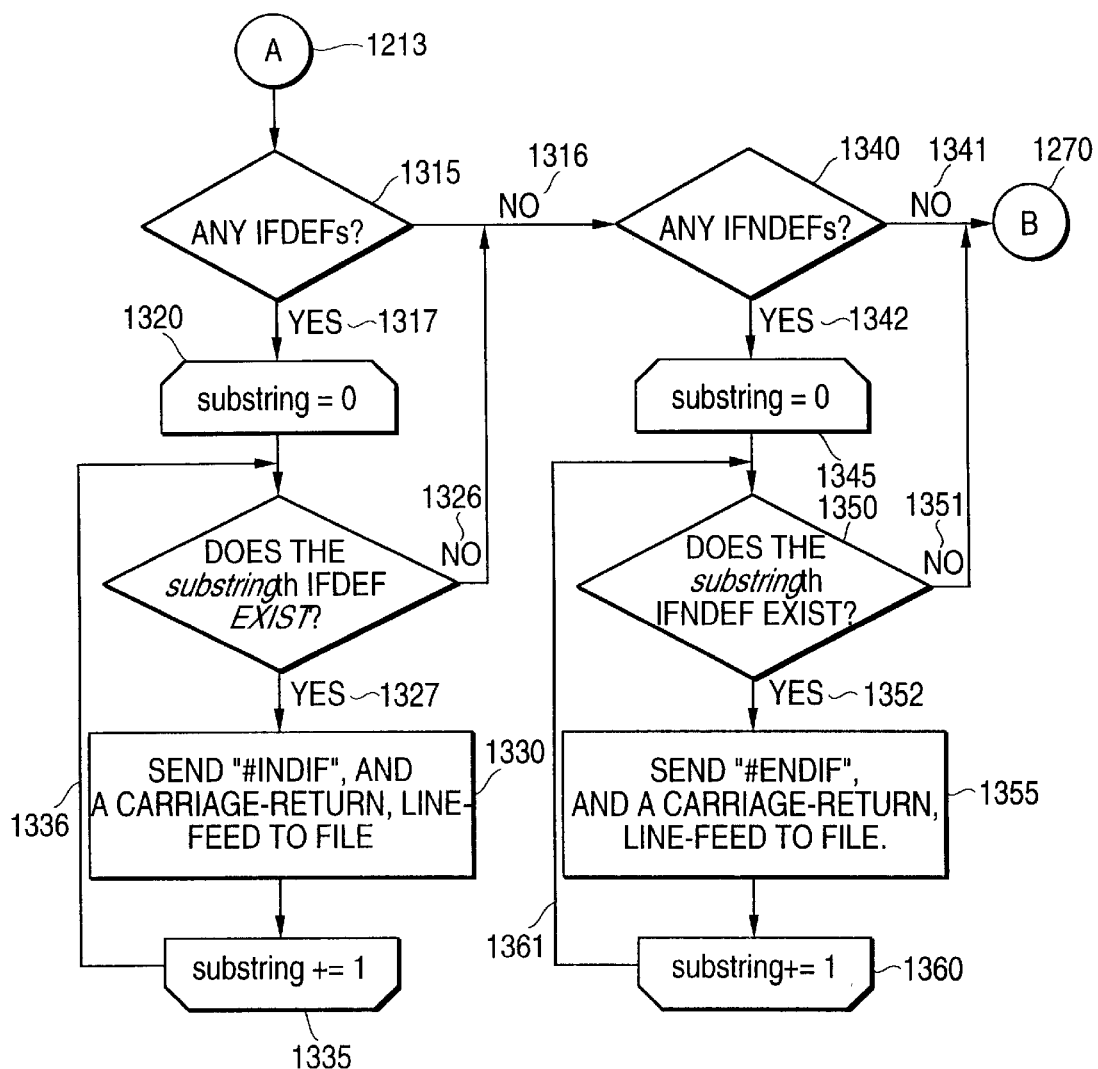
FIG. 6C illustrates a second portion of the flowchart for the GenerateIFDEF portion of the flowchart of FIG. 6A.

However, not all items in a hierarchical tree structure strictly follow the flowchart of FIGS. 6A–G. A tabulation of three flowchart overrides is given in the four-column table 1800 of FIG. 7 having rows 1801 through 1861. (It should be noted that other override features are possible and considered to be within the scope of the present invention. It should also be noted that although the overrides listed in the table 1800 are the most natural choices given the particulars of the ASL language, it is possible to construct an alternate table of overrides by appropriate alteration of the override functions.) The first column of the table 1800, Class Name 1865, lists the name of the class of an item. The second, third and fourth columns are the Generate(string) 1870, GenerateBrace 1875, and GenerateBody 1880 columns, respectively. These columns 1870, 1875 and 1880 are marked with an "x" if an item is to override the corresponding function in the flowcharts of FIGS. 6A–G. For instance, row 1833 for CItemField has x's in the Generate(string) column 1870 and the GenerateBody column 1880. Therefore, for an item of type CItemField, the stages Generate(string) 1410 of FIG. 6D and GenerateBody 1125 of FIG. 6A are overridden.

The items 1802 through 1861 are derived from CItem 1801, i.e., item CItem 1801 provides the basic functionality for all the rest of the items 1802 through 1861 in the table 1800. Items which are indented in table 1800 are derived from the first non-indented item above. Therefore, the items from CItemDeviceACAdapter 1804 to CItemDeviceVGA 1831 are derived from CItemDevice 1803 and inherit the overrides of CItemDevice 1803. For instance, the items from CItemDeviceACAdapter 1804 to CItemDeviceVGA 1831 have an override for the Generate(string) 1410 stage of FIG. 6D. Therefore, since CItemBankField 1834 and CItemIndexField 1835 are derived from CItemField 1833, they 1834 and 1835 inherit the override function of CItemField 1833. However, because CItemBankField 1834 and CItemIndexField 1835 both have an "x" in the Generate(string) 1870 column, they 1834 and 1835 override the override function of CItemField 1833. Similarly, due to the inheritance of items 1804 through 1831 from CItemDevice 1803, Generate (string) 1870 is overridden for every item 1801–1861 of the table. For completeness, the C++ code for producing the ASL Generate(string) code for CItemSDT, CItemScope, CItemProcessor, CItemDevice, CItemNameNum, CItemNameEITHE, CItemField and CItemOperationRegion are provided in FIGS. 11A and 11B.

It should be noted that items of the type CItemField can only have items of the type CItemFieldEntry as children. (A field is created via selection of Field 245 from the Objects 211 submenu of the Insert 203 pull-down menu. A field defines how an operation region is to be subdivided and accessed.) As can be seen from the override table of FIG. 7, the GenerateBody 1125 stage is overridden by CItemField 1833 items. As an appendix, a first portion of the override C++ GenerateBody code is presented in FIG. 10A, and the continuation of the code is presented in FIG. 10B. In brief, this GenerateBody code sorts and formats the CItemFieldEntry items and, as necessary, automatically generates Offset macros to fill gaps between field entries, and AccessAs macros when a difference in the attributes the field entries is detected.

It should also be noted that methods (such as the monitor temperature method _TMP 726) do not have children. Therefore, CItemMethod 1837 overrides the GenerateBrace 1120 and 1130 stages and the GenerateBody 1125 stage. The override for GenerateBrace 1120 and 1130 are void, and the override for GenerateBody 1125 generates all of the methods ASL code and the initial and final braces.

Similarly, it should also be noted that items of type CItemOperationRegion 1847 can only have items of types CItemField 1833, CItemBankField 1834 and CItemIndexField 1835 as children. (Operating regions are created via selection of Operation Region 250 from the Objects 211 submenu of the Insert 203 pull-down menu, and include such objects as system I/O address ranges, PCI configuration spaces, and embedded controller spaces.) However, these are "children" only in the sense that the ACPI specification defines them as such—they are not children in the sense of falling within the scope of the operating region. Therefore, items of type CItemOperationRegion 1837 override the GenerateBrace 1120 and 1130 stage by simply neglecting to produce a brace.

Figure 8:
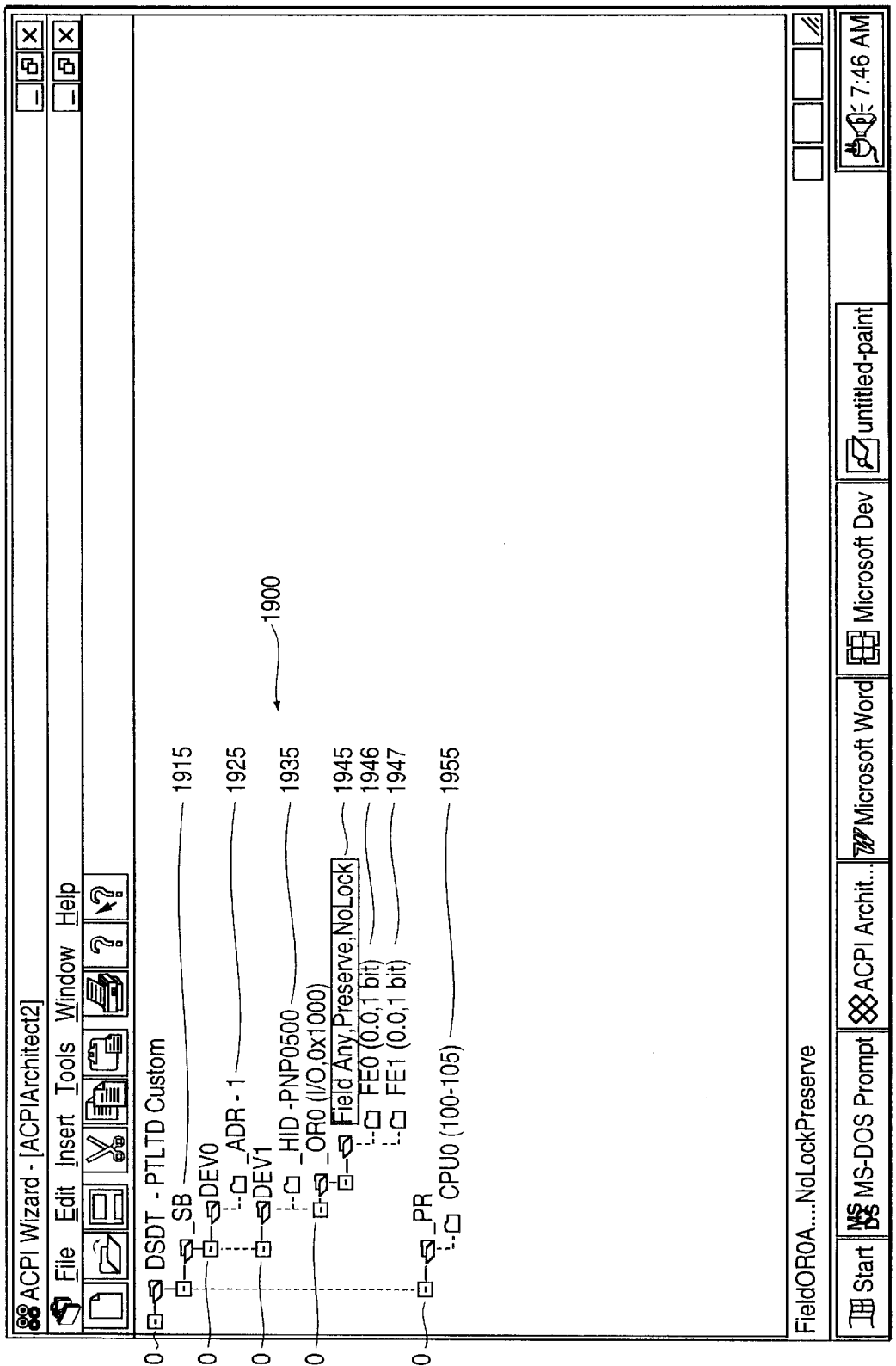
FIG. 8 illustrates an exemplary hierarchical tree structure.

To help illustrate the process of the flowcharts of FIGS. 6A through 6G, the generation of the ASL code of FIG. 9 from the hierarchical tree structure of FIG. 8 will be discussed as an example. The first item of the tree structure of FIG. 8 is the root DSDT 1910. The class of the root DSDT 1910 is CItemSDT, and as can be seen from row 1860 of the override table 1800, the Generate(string) column 1870 for this item is marked.

Figure 6D:
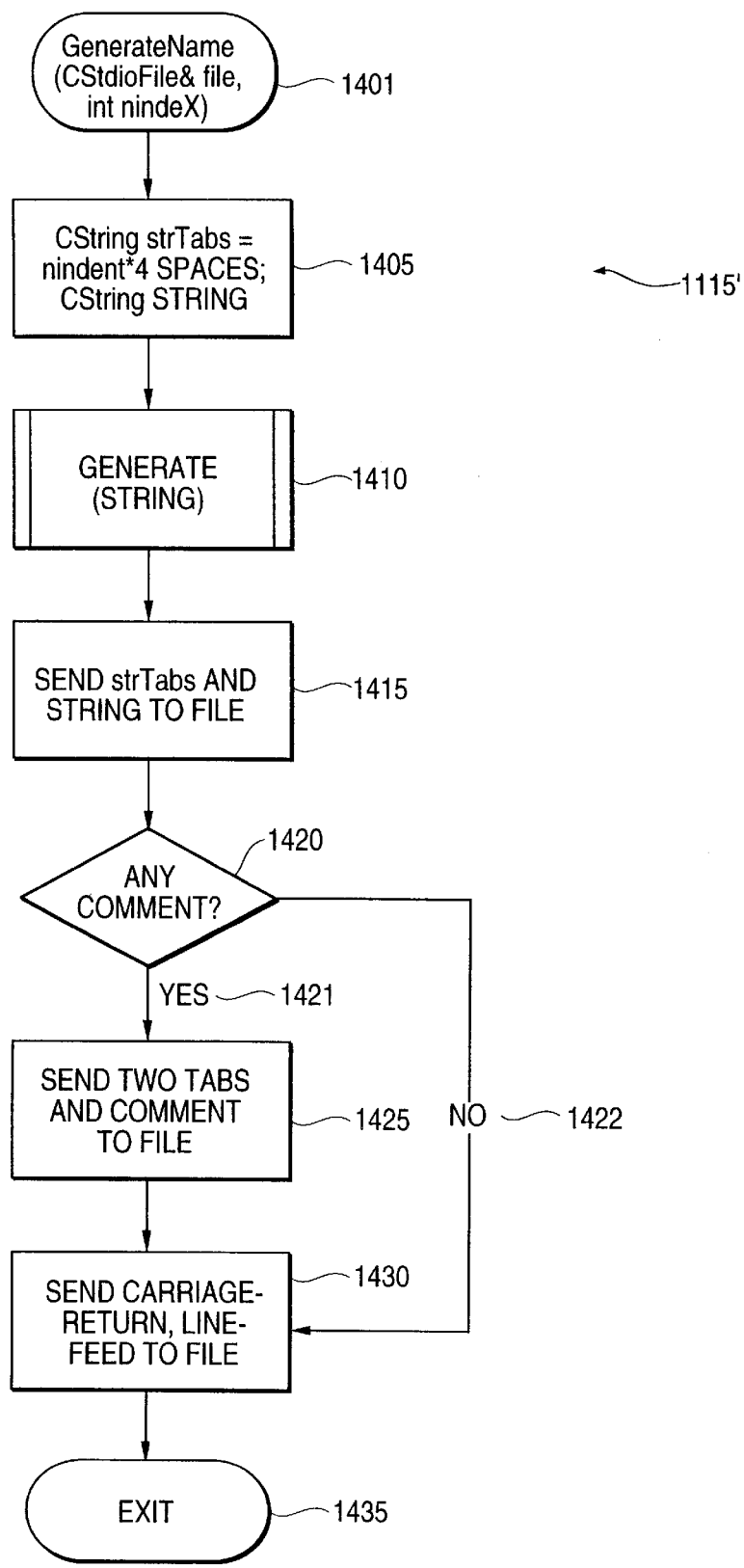
FIG. 6D illustrates the flowchart for the GenerateName portion of the flowchart of FIG. 6A.

As shown in FIG. 6A, the flowchart 1100 begins with a Generate 1105 stage with two arguments: a "file" of type "CStdioFile&" (the ampersand at the end of the type name indicates that the type is a C++ "reference" and "CStdioFile is a Microsoft Foundation Class command for the reading and writing of ASCII text files) referencing the hierarchical data structure 1900 of FIG. 8, and an integer "nindent." (It should be noted that in C++, functions of the same name can be differentiated by the number or type of arguments they have, and therefore the Generate stage 1105 of FIG. 6A with two arguments is not the same as the Generate stage 1410 of FIG. 6D.) The Generate 1105 stage is encapsulated in an oval, indicating that this stage 1105 does not reference another flowchart.

The next stage of the flowchart 1100 is the GenerateIFDEF 1110 stage. The doubled side borders of the GenerateIFDEF 1110 stage indicates that this stage references another flowchart, in this example the flowchart 1200 of FIG. 6B. As indicated by the three arguments in the GenerateIFDEF statement of stage 1110 and the same three arguments, each preceded by its type (CStdioFile&, int and BOOL) in the GenerateIFDEF statement of initial step 1205 of the GenerateIFDEF flowchart 1200, these three variables (file, nindent, and TRUE) are passed to the GenerateIFDEF flowchart 1200.

Proceeding through the flowchart 1200 of FIG. 6B, it is determined at step 1210 whether the Boolean variable "bStart" is TRUE. The answer is "Yes" 1212 since "bStart"

was passed the value TRUE at step GenerateIFDEF 1110, so control passes to the step 1215 which determines whether any IFDEF's have been defined for the item 1910. Because the Edit/Properties window for the root DSDT 1910 does not allow IFDEF's to be created for the root 1910, the answer is "No" 1216, and control passes to the step 1240 which determines if any Not-IFDEF's (IFNDEFs) are defined for the root 1910. Again, the Edit/Properties window for the root DSDT 1910 does not allow Not-IFDEF's to be created for the root 1910, so the answer is "No" 1216 and control passes to the Exit 1275 for this flowchart 1200.

Then, control passes to the next stage of the flowchart 1100 of FIG. 6A, i.e., the GenerateName 1115 stage. The box on the flowchart 1100 for the GenerateName 1115 stage has a doubled side border, indicating that there is a separate flowchart for this stage 1115, in this example the flowchart 1115' of FIG. 6D. The variables passed to the process 1115' are the data structure "file" of type CStdioFile&, and the integer "nindex." The first step 1405 of the flowchart 1115' sets the CString-type variable "strTabs" equal to (nindent*4) spaces, and defines "string" as a CString-type variable. In this example nindent hasn't been explicitly given a value, so its value is zero, and strTabs is also equal to zero.

Next, control passes to the Generate(string) 1410 stage of the flowchart 1115'. However, rather than proceeding to the flowchart 1700 of FIG. 6G, there is an override since the root 1910 is of type CItemSDT 1860 and the Generate(string) column 1870 of CItemSDT 1860 is marked). (Although the Generate(string) flowchart 1700 is provided in FIG. 6G for reference, it should be noted that Generate(string) 1410 is overridden for every item 1801–1861 of the table of FIG. 7, as mentioned above, so Generate(string) 1410 should never be accessed.) The C++ code for the override function in this example is:

```
void CItemSDT::Generate(CString& str) const
{
    str.Format("DefinitionBlock(\"%s\",\"%s\",%X,\"%s\",\"%s\",%X)",
        m_strFileName,
        m_strName,
        m_bRevision,
        m_strOEMID,
        m_strOEMTableID,
        m_dwOEMRevision);
}
```

The file name for the root 1910 is "DSDT.AML," the name of the root 1910 is "DSDT," the revision of the utility is "1," the identification number for the OEM is PTLTC, the OEM table identification is "Custom," and the OEM revision number is "0," resulting in the ASL code shown in line 2001 of FIG. 9. As mentioned above, the variable strTabs has a value of zero.

The next step 1420 of the flowchart 1115' of FIG. 6D determines if a comment was included when the properties (via the Edit/Properties menus) of the root 1910 were defined. If the answer is "Yes" 1421, then control passes to step 1425 where two tabs and the comment are sent to the file, and control passes to step 1430. In the example of the root 1910 of the present example, no comment is present. If there is not 1422 a comment, then control passes directly to step 1430. In step 1430, a carriage return and line feed are sent to the file, so that line 2002 of the ASL code of FIG. 9 begins. The flowchart 1115' is then exited 1435 and control returns to the flowchart of FIG. 6A.

Figure 6E:
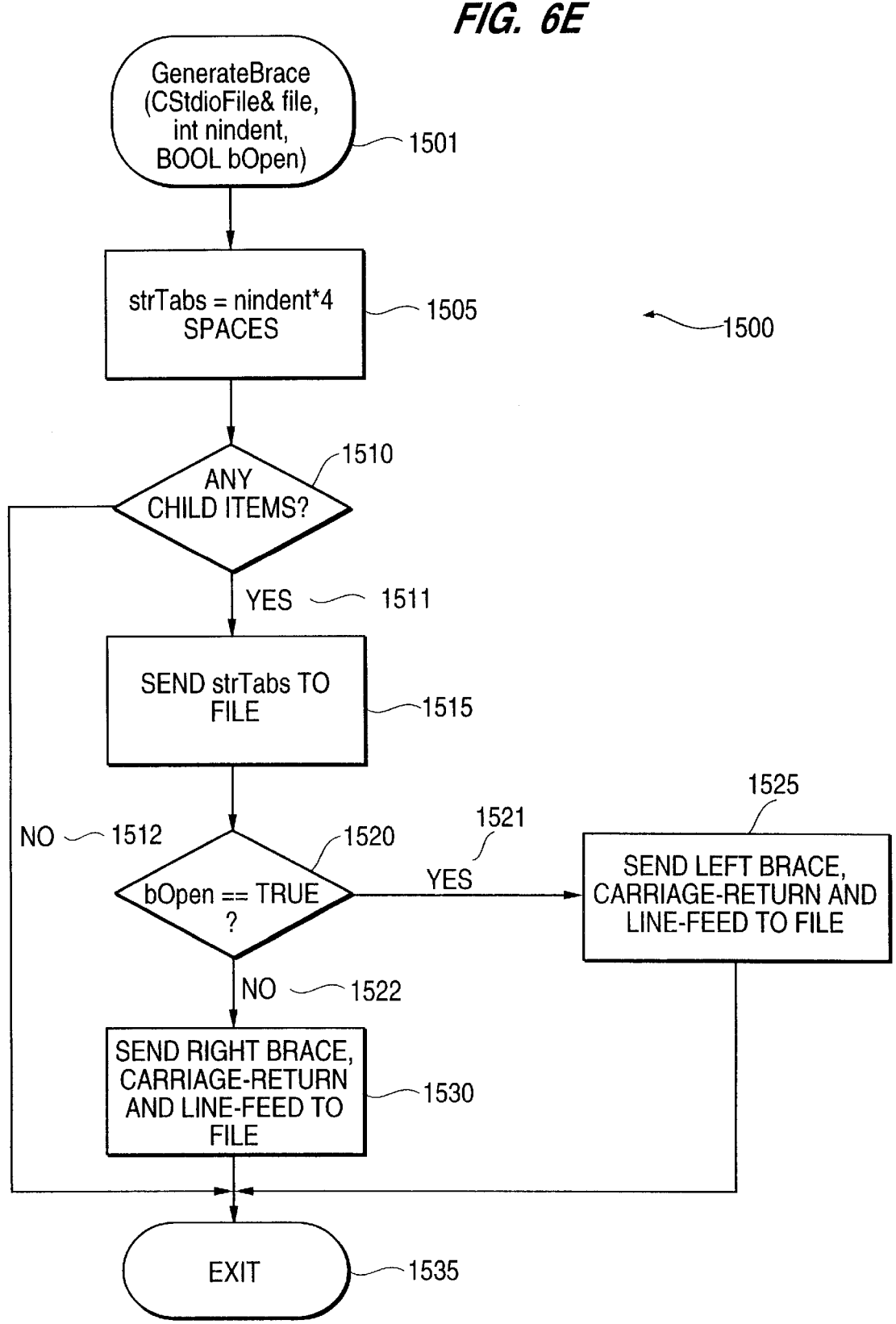
FIG. 6E illustrates the flowchart for the GenerateBrace portion of the flowchart of FIG. 6A.

Control is now passed to the GenerateBrace 1120 stage of the flowchart 1100 with the variables "file," "nindent," and "TRUE." The detailed flowchart 1500 for GenerateBrace is shown in FIG. 6E. Because nindent still has a value of zero, strTabs is set equal to zero spaces in step 1505. Then it is determined in the next step 1510 whether the root 1910 has any child items. Since the answer is "Yes" 1511 (root 1910 does have child items _SB 1915 and _PR 1950), control passes to step 1515 where strTabs is sent to the file. However, since strTabs is equal to zero spaces, no action is taken. Control then passes to step 1520 where it is determined whether bOpen is equal to "TRUE." Since bOpen was set equal to "TRUE" at initial step 1501, the answer is "Yes" 1521 and control passes to step 1525 where the left brace of line 2002 is written to the file shown in FIG. 9. Control then passes to the exit 1535, and returns to the flowchart 1100 of FIG. 6A.

Figure 6F:
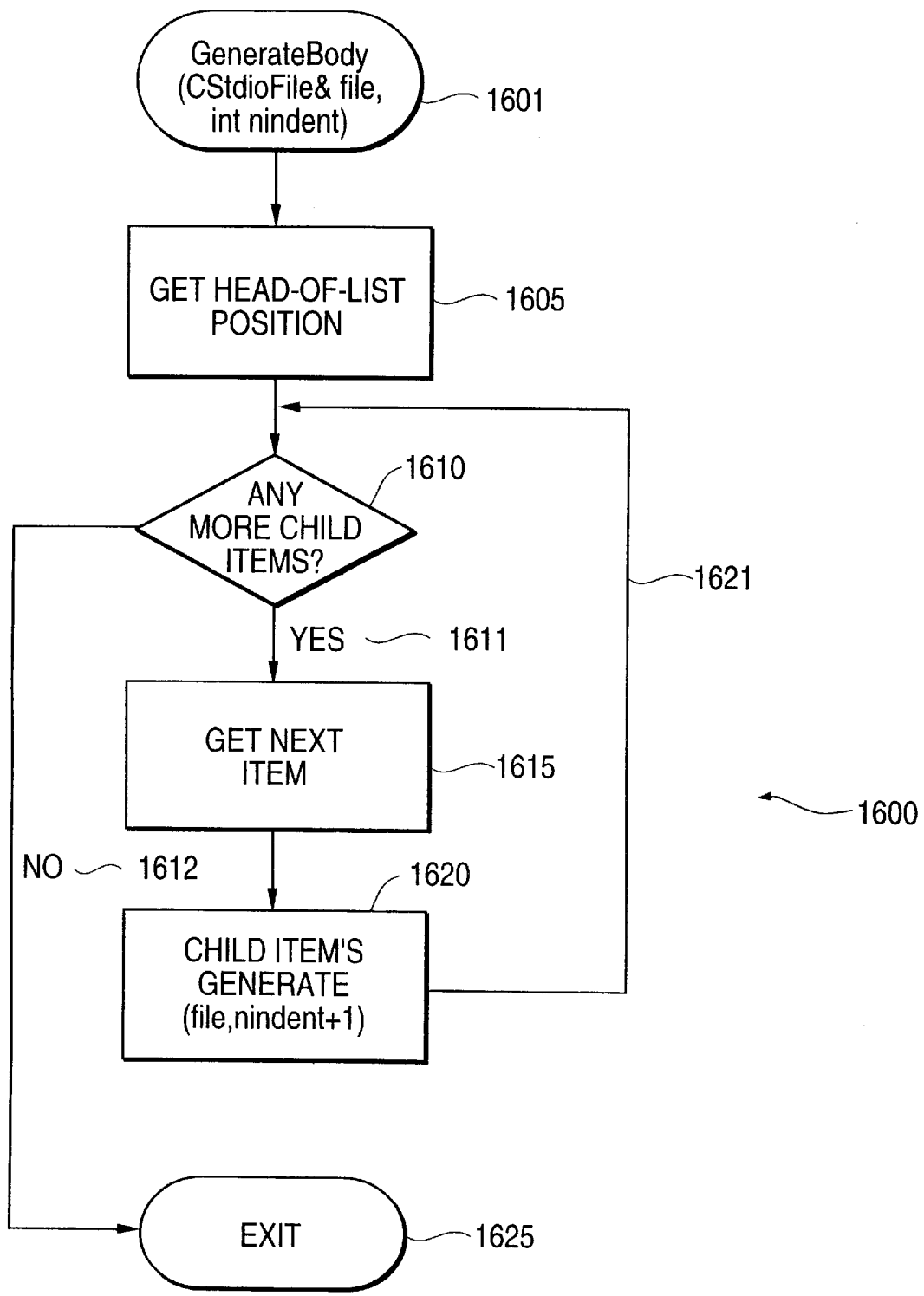
FIG. 6F illustrates the flowchart for the GenerateBody portion of the flowchart of FIG. 6A.
Figure 6G:
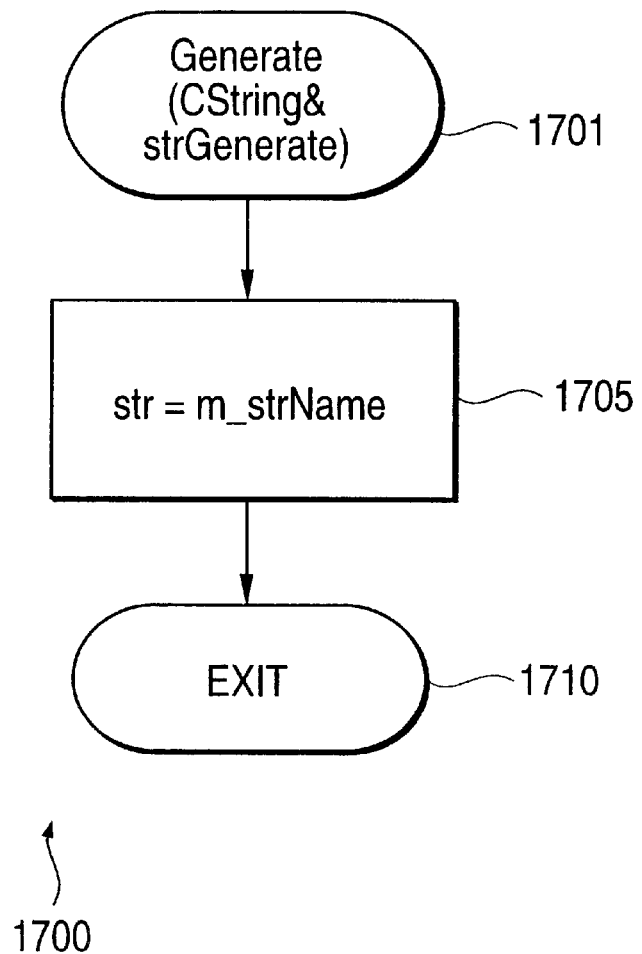
FIG. 6G illustrates the flowchart for the Generate portion of the flowchart of FIG. 6F.

After the GenerateBrace 1120 stage, control proceeds to the GenerateBody 1125 stage, the detailed flowchart 1600 for which is shown in FIG. 6F. The first step 1605 of the flowchart 1600 is the retrieval of the head-of-list, which in this example is still the root DSDT 1910. Then it is determined at step 1610 whether there are any child items beneath the head-of-list. The answer is "Yes" 1611, in this example the child item _SB 1915 and the child item _PR 1950 fall directly within the scope of the root DSDT 1910. The first of the child items SB 1915 is retrieved 1615, and a first recursive call to the Generate step 1620 is made for _SB 1915 with a value of nindent that is incremented by unity (so nindent for this recursion has a value of unity).

After the _SB 1915 recursion is completed (its recursion is discussed in detail below), control returns 1621 to step 1610 where it is determined whether there are any child items in addition to _SB 1915. In this example, the answer is "Yes" 1611 since _PR 1950 is also a child item. The item 1950 is retrieved in the next step 1615 and another recursive call is made to the Generate step 1620, again with the value of nindent incremented by unity (so for the _PR 1950 recursion nindent has a value of unity).

After the _PR 1950 recursion is completed, control again returns 1621 to step 1610 where it is determined whether there are any remaining child items. Now the answer is "No" so the flowchart 1600 of FIG. 6F is exited 1625, and control is returned to the GenerateBrace 1130 step of the flowchart 1100 of FIG. 6A. GenerateBrace 1130 is called with a value of nindent equal to zero (although nindent was incremented in the recursive calls for _SB 1915 and _PR 1950, it remained unchanged for DSDT 1910), and the third variable set to "FALSE." It should be understood that because the root DSDT 1910 generated the recursive loops for _SB1915 and _PR 1950, and these recursive loops complete before the loop for the root 1910 can continue, the ASL code generated for the root 1910 by the GenerateBrace 1130 and GenerateIFDEF 1135 steps comes after the ASL code generated for the _SB 1915 and _PR 1950 loops.

The detailed flowchart 1500 for GenerateBrace is shown in FIG. 6E. StrTabs is set equal to zero spaces in step 1505, because nindent has a value of zero. Then it is determined in the next step 1510 whether the root 1910 has any child items. Since the answer is "Yes" 1511, control passes to step 1515 where strTabs is sent to the file (since strTabs is equal to zero spaces, no action is taken). Control then passes to step 1520 where it is determined whether bOpen is equal to "TRUE." Since bOpen was set equal to "FALSE" at initial step 1501, the answer is "No" 1522 and control passes to step 1530 where the right brace of line 2025 is written to the file shown in FIG. 9. Control then passes to the exit 1535, and returns to the flowchart 1100 of FIG. 6A, where the next step is an GenerateIFDEF 1135 with the arguments "file," "nindent," and "FALSE."

The detailed flowchart 1200 for GenerateIFDEF 1135 is shown in FIG. 6B. Proceeding through the flowchart 1200 of FIG. 6B, at step 1210 it is determined whether the Boolean variable "bStart" is "TRUE." The answer is "No" 1211 since "bStart" was passed the value "FALSE" at step GenerateIFDEF 1135, so control passes via continuation (A) 1213 to the flowchart of FIG. 6B. The next step 1315 determines whether any IFDEF's have been defined for the item 1910. As mentioned above, the Edit/Properties window for the root DSDT 1910 does not allow IFDEF's to be created for the root 1910, so the answer is "No" 1316, and control passes to the step 1340 which determines if any Not-IFDEF's (IFNDEFs) are defined for the root 1910. Because the Edit/Properties window for the root DSDT 1910 does not allow Not-IFDEF's to be created for the root 1910, so the answer is again "No" 1316 and control passes via continuation (B) 1270 to the Exit 1275 for this flowchart 1200.

However, as mentioned above, before the loop for the root DSDT 1910 completes the recursions for \_SB 1915 and \_PR 1950 (and any recursions which they generate) must complete. For instance, the recursion for recursion for \_SB 1915, which is initiated in the GenerateBody loop for root DSDT 1910, begins at step 1105 of the flowchart of FIG. 6A. The next stage of the flowchart 1100 is the GenerateIFDEF 1110 stage, the detailed flowchart 1200 for which is shown in FIG. 6B. The three variables "file," "nindent," and TRUE are passed to the GenerateIFDEF flowchart 1200, and at step 1210 it is determined whether the Boolean variable "bStart" is TRUE. The answer is "Yes" 1212 since "bStart" was passed the value TRUE at step GenerateIFDEF 1110, so control passes to the step 1215 which determines whether any IFDEF's have been defined for the item 1910.

If the answer is "No" 1216, control passes to step 1240 which determines if any Not-IFDEF's(IFNDEFs) are defined for \_SB 1915. However, if the answer is "Yes" 1217 then a variable "substring" is set equal to zero 1220, and it is determined at step 1225 whether the substringth IFDEF exists. Since on the first arrival at step 1225 there is a zeroeth substring (or else the answer would have been "No" 1216 at step 1215), the answer is "Yes" 1227 and control proceeds to step 1230 where the text "#IFDEF," the substringth IFDEF and a carriage-return/line-feed are sent to the file. The substring variable is then incremented by unity 1235, and control returns 1236 to step 1225 where now it is determined whether the first IFDEF exists. If the answer is "Yes" 1227, another pass through the loop 1227/1230/1235/1236 follows, with the variable substring again being incremented by unity. However, if the answer is "No" 1226, control proceeds to step 1240 where it is determined whether any IFNDEF's have been defined for the item 1915.

If the answer is "No" 1241, control passes to the exit 1275 and returns to the flowchart 1100 of FIG. 6A. However, if the answer is "Yes" 1242 then a variable substring is again set equal to zero 1245, and it is determined at step 1250 whether the substringth IFDEF exists. Since on the first arrival at step 1250 there is a zeroeth substring, the answer is "Yes" 1252 and control proceeds to step 1255 where the text "#IFNDEF," the substringth IFNDEF and a carriage-return/line-feed are sent to the file. The substring variable is then incremented by unity 1260, and control returns 1261 to step 1250 where now it is determined whether the first IFNDEF exists. If the answer is "Yes" 1252, another pass through the loop 1252/1255/1260/1261 follows, with the variable substring again being incremented by unity. However, if the answer is "No" 1251, control proceeds to the exit 1275 and returns to the flowchart 1100 of FIG. 6A.

Control subsequently passes to the next stage of the flowchart 1100 of FIG. 6A, i.e., the GenerateName 1115 stage, the detailed flowchart 1115' for which is shown in FIG. 6D. The first step 1405 of the flowchart 1115' sets the CString-type variable "strTabs" equal to (nindent*4) spaces, and defines "string" as a CString-type variable. Now, nindent has a value of unity, so strTabs has a value of four spaces.

Control then passes to the Generate(string) 1410 stage of the flowchart 1115'. However, rather than proceeding to the flowchart 1700 of FIG. 6G, there is an override since \_SB 1915 is of type CItemScope 1859 (and the Generate(string) column 1870 of CItemScope 1859 is marked). The C++ code for the override function in this example is:

```
1    void CItemScope::Generate(CString& str) const
2    {
3        str.Format("Scope(%s)", m_strName);
4        .if(IsEmpty( ))
5            str +="{ }";
6    }
```

Because "strName", the name of the string passed to the function is "\_SB", this results in the code of line 2003 of FIG. 9. In line 4 it is then determined if the item has any child items. If not, left and right curly braces are appended to the string "str" in line 5.

The next step 1420 of the flowchart 1115' of FIG. 6D determines if there is a comment associated with \_SB 1915. If the answer is "Yes" 1421, then control passes to step 1425 where two tabs and the comment are sent to the file, and control passes to step 1430. In this example no comment is present. If there is not 1422 a comment, then control passes directly to step 1430. In step 1430 a carriage return and line feed are sent to the file, so that line 2004 of the ASL code of FIG. 9 begins. The flowchart 1115' is then exited 1435 and control returns to the flowchart of FIG. 6A.

Control is now passed to the GenerateBrace 1120 stage of the flowchart 1100 with the variables "file," "nindent," and "TRUE." The detailed flowchart 1500 for GenerateBrace is shown in FIG. 6E. Since nindent now has a value of one, strTabs is set equal to four spaces in step 1505. It is then determined in the next step 1510 whether \_SB 1915 has any child items. Since the answer is "Yes" 1511 (\_SB has the child items DEV0 1920 and DEV1 1930), control passes to step 1515 where strTabs is sent to the file, resulting in the indentation in FIG. 10 of line 2004. Control then passes to step 1520 where it is determined whether bOpen is equal to TRUE. Since bOpen was set equal to TRUE at initial step 1501, the answer is "Yes" 1521 and control passes to step 1525 where the left brace of line 2004 is written to the file shown in FIG. 9. Control then passes to the exit 1535, and returns to the flowchart 1100 of FIG. 6A.

After the GenerateBrace 1120 stage, control then passes to the GenerateBody 1125 stage, the detailed flowchart 1600 for which is shown in FIG. 6F. The first step 1605 of the flowchart 1600 is the retrieval of the head-of-list, which in this example is \_SB 1915. Then it is determined at step 1610 whether there are any child items beneath the head-of-list. The answer is "Yes" 1611, in this example the child items DEV0 1920 and DEV1 1930. The first of the child items DEV0 1920 is therefore retrieved 1615 and control proceeds to the recursive Generate 1620 step where the child item 1920 is generated with a value of nindent that is incremented by unity (so inindent now has a value of two).

After the DEV0 1920 recursion is completed, control returns 1621 to step 1610 where it is determined whether there are any child items in addition to DEV0 1920. In this example the answer is "Yes" 1611 since DEV1 1930 is also a child item. This item 1930 is retrieved in the next step 1615, and another recursive call is made to the Generate step 1620, again with the current value of nindent incremented by unity (so for the DEV1 1930 recursion nindent has a value of two).

After the DEV1 1930 recursion is completed, control again returns 1621 to step 1610 where it is determined whether there are any remaining child items. Now the answer is "No" so the flowchart 1600 of FIG. 6F is exited 1625, and control is returned to the GenerateBrace 1130 step of the flowchart 1100 of FIG. 6A. GenerateBrace 1130 is called with a value of nindent equal to unity (although nindent was incremented in the recursive calls for _SB 1915 and _PR 1950, it remained unchanged for _SB 1915) and the third variable set to "FALSE." It should be understood that because _SB 1915 generated the recursive loops for DEV0 1920 and DEV1 1930, these recursive loops complete before the loop for _SB 1915 can continue, the ASL code generated for _SB 1915 by the GenerateBrace 1130 and GenerateIFDEF 1135 steps comes after the ASL code generated for the DEV0 1920 and DEV1 1930 steps.

Similarly, the object DEV0 1920 generates a recursive loop for _ADR-1 1925, the object DEV1 generates recursive loops for _HID 1935 and OR0 1940, the object _PR 1950 generates a recursive loop for CPU0 1955, the object OR0 1940 generates a recursive loop for Field 1945, and Field 1945 generates recursive loops for FE0 1946 and FE1 1947.

Although the above description contains specific examples, these should not be construed as limiting the scope of the invention, but as merely providing illustrations of some of the preferred embodiments of this invention. Many variations are possible and are to be considered within the scope of the present invention. Thus the scope of the invention should be determined not by the examples given herein, but rather by the appended claims and their legal equivalents.

What is claimed is:

1. A utility for generation of a hierarchical tree structure corresponding to power control and data control information utilized by BIOS firmware of a computer system with an operating system, the operating system having predefined devices including a system bus and a processor, the BIOS firmware including a pointer to a root of the hierarchical tree structure corresponding to the power control and the data control information, the utility comprising:

means for defining a first scope for the root of the hierarchical tree structure;

means for attaching a bus object within the first scope of the root of the hierarchical tree structure, the bus object corresponding to the system bus of the computer system;

means for defining a second scope for the bus object; and means for attaching a processor object within the second scope of the bus object thereby indicating that communications to the processor of the computer system are routed via the system bus, the processor object corresponding to the processor of the computer system.

2. The utility of claim 1 wherein the utility further includes:

means for attaching a long response time, low power state object within the first scope of the root of the hierarchical tree structure, access of the low power object by the operating system putting the computer in a long response time, low power state;

means for attaching a short response time, high power state object within the first scope of the root of the hierarchical tree structure, access of the high power object by the operating system putting the computer in a short response time, high power state; and means for attaching an intermediate response time, intermediate power state object within the first scope of the root of the hierarchical tree structure, access of the intermediate power object by the operating system putting the computer in an intermediate response time, intermediate power state.

3. The utility of claim 1 wherein the operating system further includes a predefined general purpose event, and the utility further includes:

means for attaching a general purpose event object within the second scope of the bus object thereby indicating that the general purpose event is routed via the system bus.

4. The utility of claim 1 wherein the operating system further includes a predefined thermal event, and the utility further includes:

means for attaching a thermal event object within the second scope of the bus object thereby indicating that the thermal event is routed via the system bus.

5. The utility of claim 1 wherein the hierarchical tree structure is visually represented as a iconographic hierarchical tree.

6. The utility of claim 5 wherein the hierarchical tree structure is constructed using a "click and drag" methodology and is represented in a windows interface.

7. The utility of claim 1 where the power and data control information is compatible with the Advanced Configuration and Power Interface specification.

8. The utility of claim 1 wherein the utility further includes:

means for defining a third scope for the processor object;

means for attaching a current resource settings folder within the third scope of the processor object, access of the current resource setting folder informing the operating system of current resource settings of the processor;

means for attaching a possible resource settings folder within the third scope of the processor object, access of the possible resource settings folder informing the operating system of possible resources utilizable by the processor; and means for attaching a set resource settings folder within the third scope of the processor object, access of the set resource settings folder setting the resources utilized by the processor.

9. The utility of claim 8 wherein the utility further includes:

means for attaching a power set folder within the third scope of the processor object, access of the power set folder setting the processor in a power state level corresponding to the power set folder; and means for attaching a power resource folder within the third scope of the processor object, access of the power resource folder producing evaluation of power requirements of the processor in the power state level.

10. A recursive method for producing computer code approximating a hierarchical tree structure of items, comprising the steps of:

defining a current item as a root of the hierarchical tree structure;

generating header code corresponding to the current item;

generating opening bracket override code if the current item has an opening bracket override, following the step of generating header code;

generating an opening bracket notation if the current item has a child item and if the current item does not have the opening bracket override, following the step of generating header code;

generating body override code if the current item has a body override, following the step of generating opening bracket override code or the step of generating the opening bracket notation;

generating a recursive branch to the step of generating header code with the current item redefined as a parent item and the child item redefined as the current item, if the current item does not have a body override, following the step of generating opening bracket override code or the step of generating the opening bracket notation;

generating closing bracket override code if the current item has a closing bracket override, following the step of generating body override code or the step of generating a recursive branch; and generating a closing bracket notation if the current item has a child item and if the current item does not have the opening bracket override, following the step of generating body override code or the step of generating a recursive branch.

11. The method of claim 10 wherein the method further comprises the step of assigning an initial value of zero to an integer level variable, and wherein the step of generating the recursive branch includes a step of incrementing the integer level variable by unity if the current item does not have a body override, and the step of generating header code includes a step of indenting the header code by a number of spaces roughly proportional to the integer level variable.

12. The method of claim 10 wherein the hierarchical tree structure represents power management information and plug-and-play functionality information for an operating system of a computer system, and the computer code is ASL code for a BIOS for the computer system.

13. The method of claim 12 wherein the BIOS is an ACPI-compatible BIOS.

14. The method of claim 13 wherein the items which are field items have a body override which sorts and formats children of the field items.

15. The method of claim 14 wherein the children of the field items are field entry items.

16. The method of claim 14 wherein the body override for the field items includes a means for adapting to changes in the attributes of the field entry items.

17. The method of claim 13 wherein the items which are method items have an opening bracket override which does not generate an opening bracket notation, a closing bracket override which does not generate a closing bracket notation, and a body override which generates the ASL code for the method items, including opening and closing bracket notations.

18. The method of claim 13 wherein the items which are operation region items have an opening bracket override which does not generate an opening bracket notation, and a closing bracket override which does not generate a closing bracket notation.

19. In a computer system with an operating system and BIOS, the operating system having predefined devices including a system bus and a processor, the BIOS including a pointer to a root of the hierarchical tree structure containing the power control and the data control information, the system comprising a device for automatically configuring the power control and data control information utilized by the BIOS, the device configured to:

define a first scope for the root of the hierarchical tree structure corresponding to power control and data control information utilized by the BIOS;

attach a bus object within the first scope of the root of the hierarchical tree structure, the bus object corresponding to the system bus of the computer system;

define a second scope for the bus object; and attach a processor object within the second scope of the bus object thereby indicating that communications to the processor on the computer system are routed via the system bus, the processor object corresponding to the processor of the computer system.

20. The system of claim 19 wherein the device is further configured to:

attach a long response time, low power state object within the first scope of the root of the hierarchical tree structure, access of the low power object by the operating system putting the computer in a long response time, low power state;

attach a short response time, high power state object within the first scope of the root of the hierarchical tree structure, access of the high power object by the operating system putting the computer in a short response time, high power state; and means for attaching an intermediate response time, intermediate power state object within the first scope of the root of the hierarchical tree structure, access of the intermediate power object by the operating system putting the computer in an intermediate response time, intermediate power state.

21. The system of claim 19 wherein the operating system further includes a predefined general purpose event, and the device is further configured to:

attach a general purpose event object within the second scope of the bus object thereby indicating that the general purpose event is routed via the system bus.

22. A computer-readable storage device having a utility for generation of a hierarchical tree structure corresponding to power control and data control information utilized by BIOS firmware of a computer system with an operating system, the operating system having predefined devices including a system bus and a processor, the BIOS firmware including a pointer to a root of the hierarchical tree structure corresponding to the power control and the data control information, the utility comprising:

means for defining a first scope for the root of the hierarchical tree structure;

means for attaching a bus object within the first scope of the root of the hierarchical tree structure, the bus object corresponding to the system bus of the computer system;

means for defining a second scope for the bus object; and means for attaching a processor object within the second scope of the bus object thereby indicating that communications to the processor of the computer system are routed via the system bus, the processor object corresponding to the processor of the computer system.

23. The storage medium of claim 22 wherein the utility further includes:

means for attaching a long response time, low power state object within the first scope of the root of the hierarchical tree structure, access of the low power object by the operating system putting the computer in a long response time, low power state;

means for attaching a short response time, high power state object within the first scope of the root of the hierarchical tree structure, access of the high power object by the operating system putting the computer in a short response time, high power state; and means for attaching an intermediate response time, intermediate power state object within the first scope of the root of the hierarchical tree structure, access of the intermediate power object by the operating system putting the computer in an intermediate response time, intermediate power state.

24. The storage medium of claim 22 wherein the computer readable storage medium is a memory device, a microprocessor with integrated memory, a compact disc, or a floppy disk.

* * * * *